(12) United States Patent
Yamamoto et al.

(10) Patent No.: US 7,260,314 B2
(45) Date of Patent: Aug. 21, 2007

(54) DATA RECORDING MEDIUM, AND DATA REPRODUCING APPARATUS

(75) Inventors: Kaoru Yamamoto, Saitama (JP); Takao Sawabe, Tokyo (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 11/324,333

(22) Filed: Jan. 4, 2006

(65) Prior Publication Data

US 2006/0133777 A1     Jun. 22, 2006

Related U.S. Application Data

(63) Continuation of application No. 09/285,772, filed on Apr. 5, 1999, now Pat. No. 7,006,758.

(30) Foreign Application Priority Data

Apr. 6, 1998     (JP)     ............... P. 10-111504

(51) Int. Cl.
     *H04N 5/91*     (2006.01)
(52) U.S. Cl. ............... 386/96; 386/39; 386/40; 386/124
(58) Field of Classification Search ............... 386/39, 386/40, 45, 96, 97, 124, 125
     See application file for complete search history.

(56) References Cited

U.S. PATENT DOCUMENTS

| | | |
|---|---|---|
| 5,574,567 A | 11/1996 | Cookson et al. |
| 5,644,507 A | 7/1997 | Ostrover et al. |
| 5,748,835 A | 5/1998 | Lee |
| 5,809,201 A | 9/1998 | Nagasawa |
| 5,896,358 A | 4/1999 | Endoh et al. |
| 6,072,759 A | 6/2000 | Maeda et al. |
| 6,449,227 B1 | 9/2002 | Heo |
| 6,519,408 B2 | 2/2003 | Nagata et al. |
| 6,965,727 B1 * | 11/2005 | Sawabe et al. ............... 386/96 |
| 7,006,758 B1 * | 2/2006 | Yamamoto et al. ............... 386/95 |

FOREIGN PATENT DOCUMENTS

| | | |
|---|---|---|
| EP | 0 635 835 A2 | 1/1995 |
| EP | 0 714 098 A2 | 5/1996 |
| EP | 0 856 849 A2 | 8/1998 |
| EP | 0 867 877 A2 | 9/1998 |
| EP | 0 896 335 A2 | 2/1999 |
| EP | 0 918 332 A2 | 5/1999 |
| EP | 0 944 087 A2 | 9/1999 |
| EP | 0 986 060 A1 | 3/2000 |
| GB | 296 19 764 U1 | 2/1997 |
| JP | 02-183467 | 7/1990 |
| JP | 08-045246 | 2/1996 |
| JP | 09-055069 | 2/1997 |
| JP | 9-259572 A | 3/1997 |

(Continued)

*Primary Examiner*—James J. Groody
*Assistant Examiner*—James A. Fletcher
(74) *Attorney, Agent, or Firm*—Sughrue Mion, PLLC

(57) ABSTRACT

An information recording medium on which are recorded substantial data and reproduce control information for reproducing the substantial data, wherein the reproduce control information includes first reproduce control information required for reproducing the substantial data in all available reproduce patterns, and second reproduce control information required for reproducing the substantial data in a portion of the available reproduce patterns.

10 Claims, 17 Drawing Sheets

FOREIGN PATENT DOCUMENTS

| | | |
|---|---|---|
| JP | 09-259574 | 10/1997 |
| JP | 10-021673 A | 1/1998 |
| JP | 10-022935 | 1/1998 |
| JP | 11-016330 | 1/1999 |
| JP | 11-120747 | 4/1999 |
| JP | 11-120748 | 4/1999 |
| JP | 11-120749 | 4/1999 |
| JP | 11-185450 | 7/1999 |
| JP | 11-250631 | 9/1999 |
| JP | 11-296984 | 10/1999 |
| JP | 2000-003561 | 1/2000 |
| JP | 2003-208760 | 7/2003 |
| WO | WO99/34601 | 7/1999 |

* cited by examiner

FIG. 9

| TITLE GROUP NO. | TRACK NO. | START AD-DRESS | END AD-DRESS | OBJECT TYPE | MULTI-CHANNEL TYPE | ATTRIBUTE INFORMATION ||||| TIME INFORMATION ||
|---|---|---|---|---|---|---|---|---|---|---|---|---|
| | | | | | | CHANNEL ASSIGNMENT | CHANNEL GROUP 1 || CHANNEL GROUP 2 || TRACK START TIME | TRACK RE-PRODUCE TIME |
| | | | | | | | SAMPLING FREQUENCY | NUMBER OF QUANTIZED BITS | SAMPLING FREQUENCY | NUMBER OF QUANTIZED BITS | (min) | (min) |
| 1 | 1 | 36 | 38 | VOB | TYPE 1 | 2ch L/R | 48000 | 16 | - | - | 0 | 2 |
| 1 | 2 | 39 | 42 | VOB | TYPE 1 | 2ch L/R | 48000 | 16 | - | - | 2 | 3 |
| 1 | 3 | 43 | 45 | VOB | TYPE 1 | 2ch L/R | 48000 | 16 | - | - | 5 | 2 |
| 2 | 1 | 9 | 11 | AOB | TYPE 1 | 2ch Lf/Rf + 2ch C/S | 96000 | 24 | 48000 | 24 | 0 | 10 |
| 2 | 2 | 12 | 13 | AOB | TYPE 1 | 2ch Lf/Rf + 2ch C/S | 96000 | 24 | 48000 | 24 | 10 | 8 |
| 2 | 3 | 14 | 17 | AOB | TYPE 1 | 2ch Lf/Rf + 4ch C/LFE/Ls/Rs | 48000 | 24 | 48000 | 16 | 18 | 12 |
| 3 | 1 | 46 | 47 | VOB | TYPE 1 | 4ch Lf/Rf/C/S | 48000 | 16 | - | - | 0 | 5 |
| 3 | 2 | 48 | 50 | VOB | TYPE 1 | 4ch Lf/Rf/C/S | 48000 | 16 | - | - | 5 | 5 |
| 5 | 1 | 21 | 25 | AOB | TYPE 1 | 2ch L/R | 192000 | 16 | - | - | 0 | 20 |

CONCEPTUAL PHYSICAL LAYOUT ON DISK

DATA RECORDING MEDIUM, AND DATA REPRODUCING APPARATUS

This is a continuation of application Ser. No. 09/285,772 filed on Apr. 5, 1999 now U.S. Pat. No. 7,006,758. The entire disclosure of the prior application, application Ser. No. 09/285,772 is considered part of the disclosure of the accompanying application and is hereby incorporated by reference.

BACKGROUND OF THE INVENTION

The present invention relates to a data recording medium typified by a digital versatile disk (DVD) or a high-density optical disk which permits high density recording data, such as images and sound, as well as to a data reproducing apparatus for reproducing data from the data recording medium.

So-called laser disks (LD) and compact disks (CDs) have already become widespread as optical disk having data, such as videos and sound, recorded thereon. However, the laser disk is unable to offer the viewer a choice among alternatives relating to videos or audio to be reproduced. In short, the laser disk has been unable to realize a variety of interactive reproduce patterns. For example, when a foreign-language movie recorded on an LD is reproduced, the viewer is not allowed to select whether to display Japanese subtitles or English subtitles on the screen or whether to reproduce the sound dubbed in English or the sound dubbed in Japanese.

In contrast to the case of the CD, various proposals or developments have recently been made with regard to a digital video disk or digital versatile disk (DVD), which is equal in size to an optical disk but has about ten times the storage capacity. So long as subtitles in a plurality of languages and sound dubbed in a plurality of languages are recorded on the DVD together with reproduce control data, the viewer can make a choice from alternatives, thus enabling a variety of interactive reproduce patterns. reproduce-only DVD player is not required to reproduce video data, the reproduce control information items, such as subtitles or multi-angles, required for interactive reproduce of videos are unnecessary.

Even in the case of the sound-reproduce-only DVD player, various information items are available as reproduce control information for reproducing only audio information in various manners. Of the sound-only DVD players, an unsophisticated player which plays back linear PCM sound data in the form of two-channel stereo sound must select from the sound data reproduce control information only the information items required for reproducing two-channel stereo sound.

The reproduce control information and the substantial data are spread over the DVD disk. If an attempt is made to ascertain the total time required for reproducing the entire DVD disk, the reproduce control information items recorded so as to become spread over the disk must be aggregated. In the hierarchical structure in which the reproduce control information is recorded so as to become spread over the disk in order to readily fulfill complicated functions by use of a simple structure, ascertainment of the information about the overall disk in a single operation contrarily involves more complicated processing.

SUMMARY OF THE INVENTION

The present invention has been conceived in light of the foregoing drawbacks of the background art, and the object of the present invention is to provide a data recording medium which permits fulfillment of various complicated functions and which enables reproduce of data through more-simplified processing when a limited part of functions is implemented, as well as to provide an apparatus for reproducing data from the data recording medium.

According to a first aspect of the present invention, there is provided an information recording medium on which are recorded substantial data and reproduce control information for reproducing the substantial data, wherein the reproduce control information comprises: first reproduce control information required for reproducing the substantial data in all available reproduce patterns; and second reproduce control information required for reproducing the substantial data in a portion of the available reproduce patterns.

According to the first aspect of the invention, the second reproduce control information for reproducing the substantial data in a portion of reproduce patterns is recorded, thereby simplifying reproduce processing when substantial data are reproduced in a portion of reproduce patterns.

According to a second aspect of the present invention, there is provided, preferably, the substantial data are divided into one or a plurality of tracks and are defined as one or a plurality of titles, each corresponding to a logical set comprising one or the plurality of tracks; the first reproduce control information is recorded on a per-title basis so as to spread over the information recording medium; and the second reproduce control information corresponds to reproduce control information items about the tracks recorded on the information recording medium being collectively recorded in a predetermined location of a program area.

As a result, the second reproduce control information is recorded in a predetermined location of a program area. Therefore, when reproducing the substantial data in a portion of the reproduce patterns, the player can make a direct access to the predetermined location.

According to a third aspect of the present invention, there is provided, preferably, the tracks comprise tracks which can be reproduced in all the reproduce patterns; and tracks which can be reproduced in only a portion of the reproduce patterns.

As a result, the reproduce patterns can be set for each track, thereby enabling reproduce of the substantial data in various reproduce patterns satisfying the user's demand.

According to a forth aspect of the present invention, there is provided, preferably, the first reproduce control information corresponds to reproduce control information used in an information reproducing apparatus capable of reproducing all the tracks; and the second reproduce control information corresponds to reproduce control information used with an information reproducing apparatus capable of reproducing a portion of the tracks.

As a result, all the tracks can be reproduced by means of an information reproducing apparatus which can reproduce all the tracks, by use of the first reproduce control information. Further, for example, a portable player—whose functions are limited and which can reproduce only a portion of the tracks—can readily perform processing operations by use of the second reproduce control information.

According to a fifth aspect of the present invention, there is provided, preferably, the first reproduce control information corresponds to reproduce control information used with an information reproducing apparatus capable of reproducing the substantial data in all the available reproduce patterns; and the second reproduce control information corresponds to reproduce control information used with an information reproducing apparatus capable of reproducing the substantial data in a portion of the reproduce patterns.

In the present invention, there are provided first reproduce control information for use with an information reproducing apparatus capable of reproducing substantial data into all the reproduce patterns, and second reproduce control information for use with an information reproducing apparatus capable of reproducing the substantial data into only a portion of the reproduce patterns. As a result, reproduce processing performed by the player capable of reproducing the substantial data into only a portion of the reproduce patterns can be simplified.

According to a sixth aspect of the present invention, there is provided, preferably, the second reproduce control information comprises at least address information, attribute information, and reproduce times relating to the tracks.

As a result, since only the information required for reproducing the tracks in a portion of the reproduce patterns is recorded as the second reproduce control information, information relating to the tracks to be reproduced can be readily reproduced without involvement of complicated processing.

According to a seventh aspect of the present invention, there is provided, preferably, the second reproduce control, preferably, the program area comprises an audio zone in which the substantial data chiefly comprise audio data; and the second reproduce control information is recorded at the head of the audio zone.

As a result, the second reproduce control information can be obtained prior to reproduce of the substantial data.

According to an eighth aspect of the present invention, there is provided, preferably, the program area comprises an audio zone in which the substantial data chiefly comprise audio data, and a video zone in which the substantial data chiefly comprise video data; and the second reproduce control information is recorded at the head of the audio zone.

As a result, the second reproduce control information can be obtained prior to reproduce of the substantial data. Further, only audio data of the substantial data in the video zone can be reproduced by use of the second reproduce control information.

According to a ninth aspect of the present invention, there is provided an information reproducing apparatus for reproducing an information recording medium on which are recorded substantial data, first reproduce control information required for reproducing the substantial data in all available reproduce patterns, and second reproduce control information required for reproducing the substantial data in a part of all the available reproduce patterns, the player comprising: reading means for reading information from the information recording medium; and reproduce processing means capable of reproducing the substantial data in a portion of the available reproduce patterns, wherein the reproduce processing means acquires the second reproduce control information prior to any of the substantial data, stores the thus-acquired second reproduce control information into storage means, and plays back the substantial data on the basis of the second reproduce control information.

As a result, the substantial data can be reproduced by reading the second reproduce control information, and a necessity for extracting required reproduce control information from the first reproduce control information may be eliminated, thus enabling simplification of reproduce processing.

According to a tenth aspect of the present invention, there is provided, preferably, the substantial data are divided into one or a plurality of tracks and are defined as one or a plurality of titles, each corresponding to a logical set comprising one or the plurality of tracks; the player further comprises means for specifying a track to be reproduced; and the reproduce processing means acquires information relating to the thus-specified track from the second reproduce control information stored in the storage means.

As a result, information relating to a track to be reproduced can be readily obtained without involvement of complicated processing.

According to an eleventh aspect of the present invention, there is provided, preferably, a signal embodied in a carrier wave comprising: substantial data, and reproduce control information for reproducing the substantial data, the reproduce control information comprising; first reproduce control information required for reproducing the substantial data in all available reproduce patterns; and second reproduce control information required for reproducing the substantial data in a part of all the available reproduce patterns.

According to a twelfth aspect of the present invention, there is provided, preferably, the signal as defined in the eleventh aspect, wherein the substantial data are divided into one or a plurality of tracks and are defined as one or a plurality of titles, each corresponding to a logical set comprising one or the plurality of tracks; the first reproduce control information is recorded on a per-title basis so as to spread over the information recording medium; and the second reproduce control information corresponds to reproduce control information items about the tracks recorded on the information recording medium being collectively recorded in a predetermined location of a program area.

According to a thirteenth aspect of the present invention, there is provided, preferably, the signal as defined in the twelfth aspect, wherein the tracks comprise: tracks to be reproduced in all the reproduce patterns; and tracks to be reproduced in only a portion of the reproduce patterns.

According to a fourteenth aspect of the present invention, there is provided, preferably, the signal as defined in the twelfth aspect, wherein the first reproduce control information corresponds to reproduce control information used in an information reproducing apparatus capable of reproducing all the tracks; and the second reproduce control information corresponds to reproduce control information used with an information reproducing apparatus capable of reproducing a portion of the tracks.

According to a fifteenth aspect of the present invention, there is provided, preferably, the signal as defined in the eleventh aspect, wherein the first reproduce control information corresponds to reproduce control information used with an information reproducing apparatus capable of reproducing the substantial data in all the available reproduce patterns; and the second reproduce control information corresponds to reproduce control information used with an information reproducing apparatus capable of reproducing the substantial data in a portion of the reproduce patterns.

According to a sixteenth aspect of the present invention, there is provided, preferably, the signal as defined in the twelfth aspect, wherein the second reproduce control information comprises at least address information, attribute information, and reproduce times relating to the tracks.

According to a seventeenth aspect of the present invention, there is provided, preferably, the signal as defined in the aspect twelfth, wherein the program area comprises an audio zone in which the substantial data chiefly comprise audio data; and the second reproduce control information is recorded at the head of the audio zone.

According to an eighteenth aspect of the present invention, there is provided, preferably, the signal as defined in the twelfth aspect, wherein the program area comprises an audio zone in which the substantial data chiefly comprise audio data, and a video zone in which the substantial data chiefly comprise video data; and the second reproduce control information is recorded at the head of the audio zone.

BRIEF DESCRIPTION OF THE DRAWINGS

FIG. 9 is a table showing data to be written in a SAPPT;

DETAILED DESCRIPTION OF THE PREFERRED EMBODIMENTS

Preferred embodiments of the present invention will be described hereinafter by reference to the accompanying drawings.

(1) DVD Video Format

A format (or a physical recording format) in which video data and sound data (including music data, and the same applies to any counterparts in the following descriptions) are recorded on a video DVD will be first described by reference to FIG. 1.

(1.1) Physical Format

Figure 1:
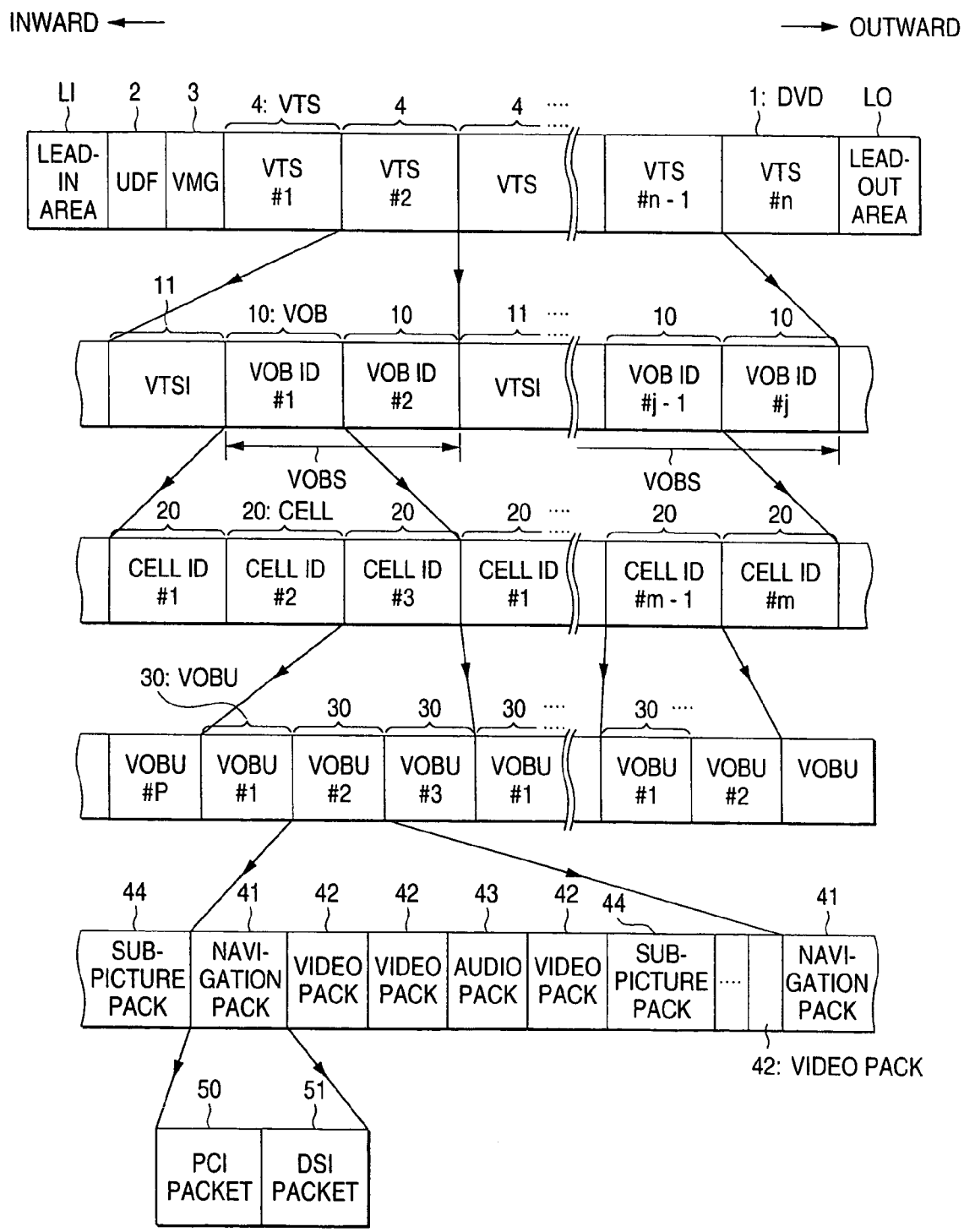
FIG. 1 is a schematic representation showing the physical structure (or physical format) of a DVD video format.

As shown in FIG. 1, a lead-in area LI is formed at the innermost peripheral area of a video DVD 1, and a lead-out area LO is formed at the outermost peripheral area of the same. The space between the lead-in area LI and the lead-out area LO corresponds to a volume space. Video and audio data are recorded in the volume space in such a way as to become divided into a plurality of VTSs (Video Title Sets) 4 (VTS#1 to VTS#n), each of which is assigned an identification (ID) number. A VTS is a set (or group) of relevant selections, such as movies, which are provided to the audience by the producer(s) and are identical with one another in terms of attributes, such as the number of audio and sub-picture data sets, specifications, and available language(s).

A universal disk format (UDF) 2 is recorded so as to be located adjacent to and outward from the lead-in area LI and comprises information for managing the format of files recorded on the disk. Further, a video manager (VMG) 3 is recorded so as to adjoin the UDF 2. The information written in the VMG 3 comprises a menu for providing options to the user, information for the purpose of blocking unauthorized duplication of the disk, an access table for enabling the user to access individual titles (i.e., selections), and management information for managing the entirety of the video and audio data recorded on the video DVD 1.

Video and audio data are recorded in one VTSs 4 so as to become divided into a plurality of video objects (VOBs) 10, each of which is assigned an ID number, and these VOBs 10 are preceded by video title set information (VTSI) 11. The plurality of VOBs 10 are collectively referred to as a VOB set (VOBS).

The VTSI 11 recorded at the head of the VTS 4 comprises information, such as program chain information (PGCI), which serves as first reproduce control information about a program chain relating to a logic segment made by combination of a plurality of cells (which will be described later). In each VOB 10, a substantial portion of the video and audio data is recorded.

A single VOB 10 comprises a plurality of cells 20, each of which is assigned an ID number, and a single cell 20 comprises a plurality of VOB units (VOBUs) 30, each of which is assigned an ID number. The VOBU 30 is a single unit comprising video, audio, or sub-picture data (data regarding sub-pictures such as subtitles of a movie) or a navigation pack to be described later.

A single VOBU 30 comprises a navigation pack 41 storing information for controlling the video data included in the VOBU 30; a video pack 42 including video data; an audio pack 43 including audio data; and a sub-picture pack 44 including sub-picture data. Only videos are recorded in the form of video data, and only sound selections are recorded in the form of audio data. Only graphic data, such as text and graphics, are recorded in the form of sub-picture data.

In a pack header recorded at the head of each pack (P), there are recorded start time information, which is called a system clock reference (SCR) and represents a reproduce start time at which the data included in each pack P are read from a track buffer of an information reproducing apparatus (which will be described later) and are entered into individual buffers, and a start code representing the start of the pack P.

The navigation pack 41 comprises data search information (DSI) data 51 serving as retrieval information for retrieving video or sound selections desired to be reproduced and displayed (more specifically, an address on the DVD where the video or sound selections desired to be reproduced are recorded), and presentation control information (PCI) data 50 for controlling reproduce and displaying the video or sound selection retrieved on the basis of the DSI data 51.

All the video packs 42 included in a single VOBU 30 are formed from one or a plurality of groups of pictures (GOPs).

The GOP is the minimum video unit which can be reproduced solely and is defined by MPEG (Moving Picture Experts Group) 2, which is adopted as a picture compression method for recording video data on the DVD 1 according to the present embodiment.

By use of the hierarchical recording format that has been described with reference FIG. 1, a producer (hereinafter simply referred to as a "producer") who produces the data to be recorded on the DVD 1 sets segments freely, as intended, and the data are recorded in the thus-determined segments. Data are reproduced according to a logical structure (which will be described later) on a per-segment basis, thus providing a variety of reproduce patterns.

(1.2) Logical Format

Figure 2:
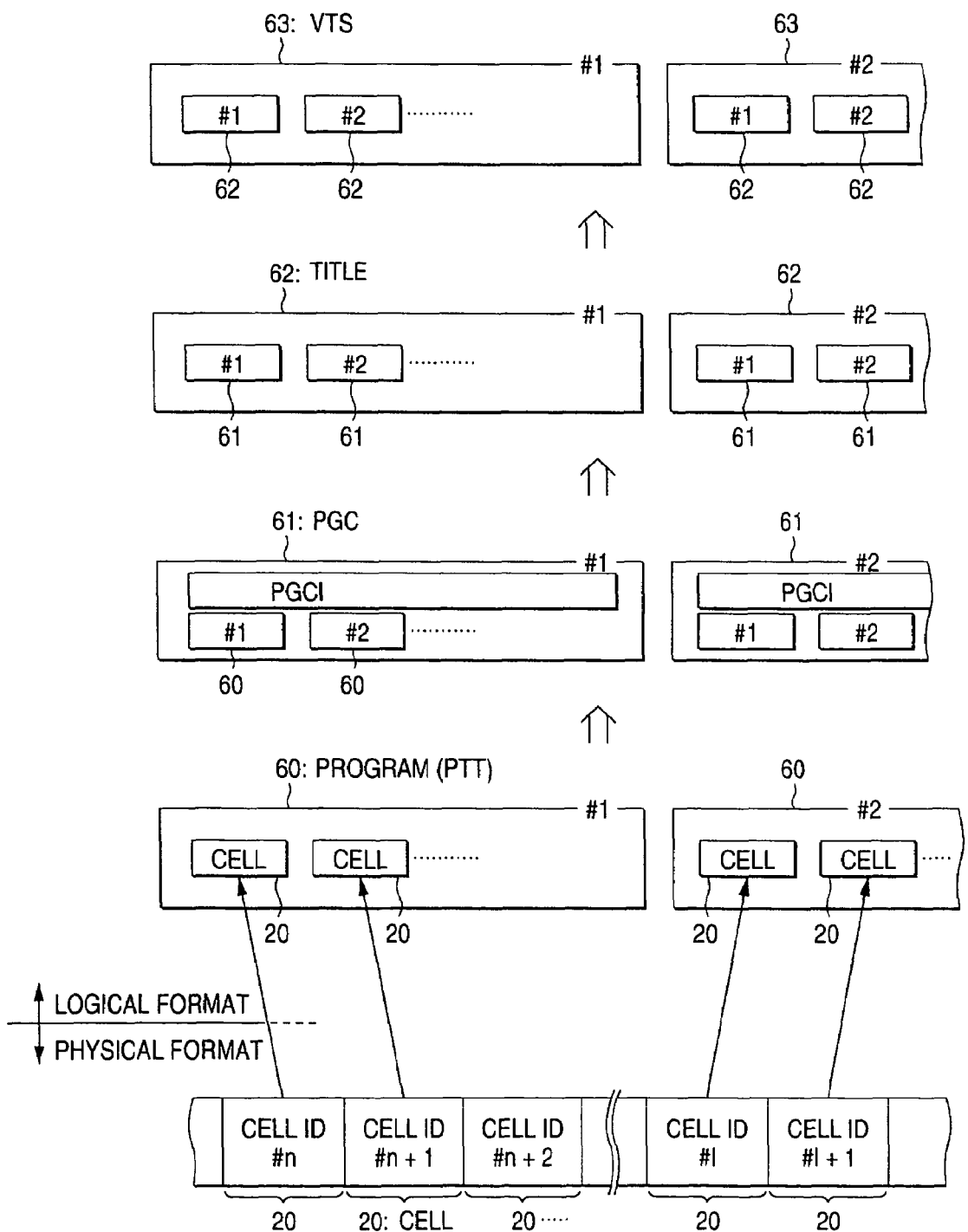
FIG. 2 is a schematic representation showing the physical structure (or physical format) of the DVD video format.

With reference to FIG. 2, a logical format (or logical structure) formed by combination of the data recorded in the physical segments shown in FIG. 1 will now be described. Data are not actually recorded on the DVD 1 according to the logical structure shown in FIG. 2; rather, the logical structure shown in FIG. 2 provides the format used for recording, on the DVD 1; particularly, in the VTSI 11, reproduce control information (access or time information) used for reproducing individual data sets (particularly cells 20) shown in FIG. 1.

For convenience of explanation, the logical format shown in FIG. 2 is described from the bottommost row. A single program 60 is logically constituted by selective combination of the plurality of cells 20 of the physical structure described by reference to FIG. 1. The producer may define one program 60 or a plurality of programs 60 as the minimum unit which the audience can freely select and watch. This unit is referred to as a part of a title (PTT). The number of a single cell 20 is handled as a cell ID number (shown as a cell ID number in FIG. 1) when the cell 20 is handled according to the physical format shown in FIG. 1.

A single PGC (program chain) 61 is logically constituted by combination of a plurality of programs 60. The previously-described PGCI is defined for each PGC 61. The PGCI comprises the sequence in which the cells 20 of each program 60 are reproduced at the time of reproduce of individual programs 60 (according to this sequence, a unique program number is assigned to each program 60), the addresses on the DVD 1 at which the individual cells 20 are recorded, and the number of the head cell 20 to be reproduced in one program 60.

In addition to the PGCI, a single PGC 61 comprises substantial video and audio data as a combination of programs 60 (in other words, as a combination of the cells 20). A single title 62 is logically formed by one or a plurality of PGCs 61. For example, the title 62 corresponds to video information for one selection (film) and is complete information provided to the viewer of the DVD 1 by the producer. A single VTS 63 is logically formed from one or a plurality of titles 62.

The data corresponding to a single VTS 63 shown in FIG. 2 matches the data included in a single VTS 4 shown in FIG. 1. More specifically, all the data logically included in the VTS 63 shown in FIG. 2 are collectively recorded as a single VTS 4.

On the basis of the logical format described above, a video or sound selection to be enjoyed by the viewer is produced by the producer designating the data segmented according to the physical structure.

(2) DVD Audio Format

A format (a physical recording format) in which audio data (including music and sound data, and the same applies to any counterparts in the following descriptions) are recorded on an audio DVD will now be described by reference to FIG. 3.

(2.1) Physical Format

A physical format (physical recording format) on the audio DVD will first be described by reference to FIG. 3.

Figure 3:
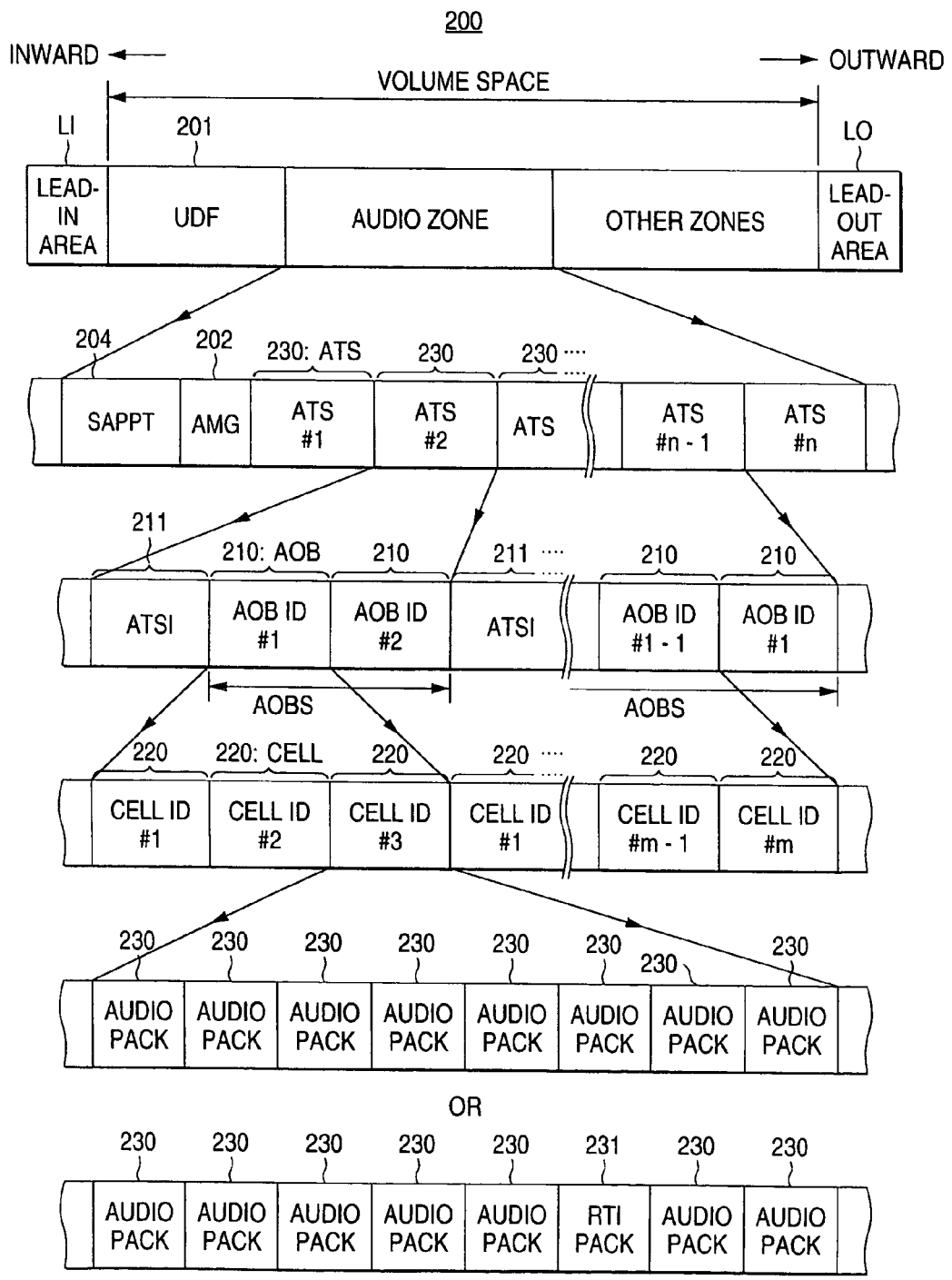
FIG. 3 is a schematic representation showing the physical structure (or physical format) of a DVD audio format.

As shown in FIG. 3, a lead-in area LI is formed at the innermost peripheral area of an audio DVD 200 according to the present embodiment, and a lead-out area LO is formed at the outermost peripheral area of the same. The space between the lead-in area LI and the lead-out area LO corresponds to a single volume space. Inevitably, audio zones are provided in the volume space. In each audio zone, audio data are recorded so as to become divided into a plurality of audio title sets (ATSs) 203 (ATS#1 to ATS#n), each of which is assigned an identification (ID) number.

A universal disk format (UDF) 201 is recorded so as to be located adjacent to and outward from the lead-in area LI and comprises information for managing the format of files recorded on the disk. Further, a simple audio part table (SAPPT) 204 is recorded so as to adjoin the UDF 2. The SAPPT 204 is recorded on the DVD disk having an audio zone. Although the SAPPT 204 is recorded at the head of the audio zone in FIG. 3, the SAPPT 204 may alternatively be recorded in the lead-in area or an audio manager (AMG) 202 (which will be described below).

The AMG 202 is recorded so as to adjoin the SAPPT 204. The information written in the AMG 202 comprises a menu for providing options to the user, information provided for the purpose of blocking unauthorized duplication of the disk, an access table for enabling the user to access individual titles, and management information for managing the entirety of the audio data recorded on the audio DVD 200.

A single ATS 203 comprises a plurality of audio objects (AOBs) 210, each of which is assigned an ID number, and the audio objects 210 are led by audio title set information (ATSI) 211. The plurality of AOBs 210 constitute an AOB set (AOBS) which corresponds to a substantial portion of the audio data.

The ATSI 211 recorded at the head of the ATS 203 comprises information, such as program chain information (APGCI), which serves as first reproduce control information about a program chain relating to a logic segment made by combination of a plurality of cells (which will be described later) In each AOB 210, a substantial portion of the audio data is recorded, and a single AOB 210 comprises a plurality of cells 220, each of which is assigned an ID number.

A single cell 220 comprises a plurality of audio packs 230 or a real-time information pack 231 and a plurality of audio packs 230. The audio pack 230 is formed by packaging audio data to be recorded on the audio DVD 200 into a pack in units of predetermined size. For example, audio data digitized by linear PCM are included in the audio data. The real-time information pack 231 includes text information, bits per minute (BPM), bit data, etc.

By use of the hierarchical recording format that has been described with reference FIG. 3, a producer (hereinafter simply referred to as a "producer") who produces the data to be recorded on the audio DVD 200 freely sets segments, as intended, and the data are recorded in the thus-determined segments. Data are reproduced according to a logical structure (which will be described later) on a per-segment basis, thus providing a variety of reproduce patterns.

(2.2) Logical Format

Figure 4:
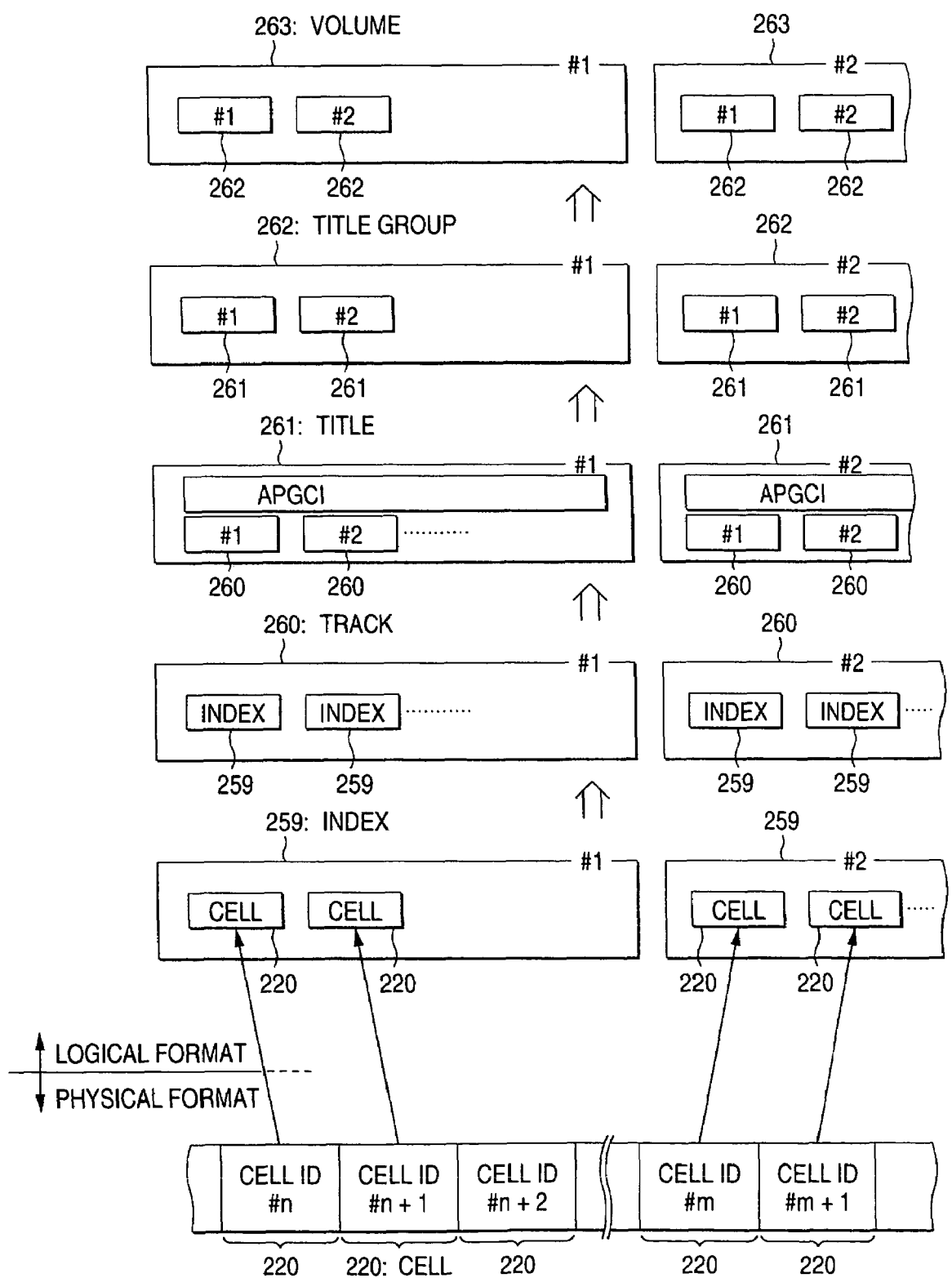
FIG. 4 is a schematic representation showing the physical structure (or physical format) of the DVD audio format.

With reference to FIG. 4, a logical format (or logical structure) formed by combination of the data recorded in the physical segments shown in FIG. 3 will now be described. Data are not actually recorded on the audio DVD 200 according to the logical structure shown in FIG. 4; rather, audio data are recorded on the audio DVD 200 according to the physical format shown in FIG. 3. The information used for reproducing the audio data is recorded on the previously-described AMG 202 or ATSI 211 according to the logical format shown in FIG. 4.

For convenience of explanation, the logical format shown in FIG. 4 is described from the bottommost row. An index 259 is formed by one cell 220 or selective combination of a plurality of cells 220 provided in the physical structure described by reference to FIG. 3. The index may be used as a musical selection and serves as a minimum unit accessible to the user.

A single track 260 is logically formed from one index 2S9 or a plurality of indices 259. The track 260 serves as an information unit corresponding to one selection. The user can select and access an arbitrary selection (music) directly. When a single cell 220 is handled according to the physical format shown in FIG. 3, the number of the single cell 220 is taken as a cell ID number (represented as cell ID# in FIG. 3). In contrast, when a plurality of cells 220 are handled according to a logical format shown in FIG. 4, the numbers of the cells 220 are taken as cell numbers in the sequence in which the cells 220 are described in the APGCI (which will be described later).

The track 260 (musical selection) is a data unit including a plurality of cells and a cluster of cells possessing a certain common attribute. In other words, all the cells within a track possess the same attribute. Further, all the cells included in a track are recorded so as to become adjacent to one another within the same object.

A single title 261 is logically formed from one track 260 or by combination of a plurality of tracks 260. However, the title 261 per se is not acknowledged as a means of access by the user. Therefore, the user cannot access an arbitrary title by designation of a title number.

The DVD audio format enables the attributes of the individual tracks 260 constituting the title 261 to be independently defined in a maximum of eight patterns. Specifically, the attribute of the track 260 serving as audio data, such as the number of channels, a quantization method, or a sampling frequency, may be changed from track to track.

The previously-described APGCI is defined for each title 261. The APGCI comprises the attributes of individual tracks 260, the sequence in which the cells 220 are reproduced in each track at the time of reproduce of each of the tracks 260, the addresses on the audio DVD 200 in which the cells 220 are recorded, the number assigned to the cell 220 provided at the head of a single track 260, the method by which each of the tracks 260 is reproduced, and various commands.

In addition to the AGPCI, a single title 261 comprises substantial audio data in the form of a combination of tracks (musical selections) 260 (in other words, in the form of a combination of the cells 220).

A single title group 262 is logically formed from one title 261 or a plurality of titles 261. Further, the title group 262 serves as the largest unit accessible to the user, and a maximum of nine title groups 262 can be defined in one volume. The title group 262 is formed from one title 261 or a plurality of titles 261 aggregated on the basis of certain relevance. All the titles 261 provided in one title group are reproduced in succession. For instance, albums of a certain singer or composer may be aggregated into one title group.

A single volume 263 is logically formed from one title group 262 or a plurality of title groups 262. The volume 263 is an information unit corresponding to a single album (DVD). Audio data aggregated under one title shown in FIG. 4 are actually recorded in any one of the ATSs 203 on the audio DVD 200 shown in FIG. 3.

Music is reproduced for the viewer by the producer designating the data segmented according to the physical structure, on the basis of the previously-described logical format.

(3) Types of DVDs

The types of DVDs will now be described. In the following description, data which comprise video and audio data and are to be recorded on a DVD, such as a movie, will often be referred to as "AV data." Data regarding solely video selections are referred to as "video data," and data regarding solely audio selections are referred to as "audio data."

DVD players for reproducing various types of DVDs comprise four types: namely, a video DVD player (hereinafter referred to as a "video player") capable of reproducing AV data recorded according to a DVD video format; an audio DVD player (hereinafter referred to as an "audio player") which plays back in various reproduce patterns audio data recorded according to a DVD audio format; an unsophisticated audio DVD player (i.e. a simple audio player) (hereinafter referred to as an "unsophisticated audio player") which plays back in two channels LPCM audio data recorded according to a DVD audio format; and a compatible DVD player (hereinafter referred to as a "compatible player") capable of reproducing both AV data recorded according to the DVD video format and audio data recorded according to a DVD audio format. Detailed description of the individual DVD players will be provided later.

Figure 5:
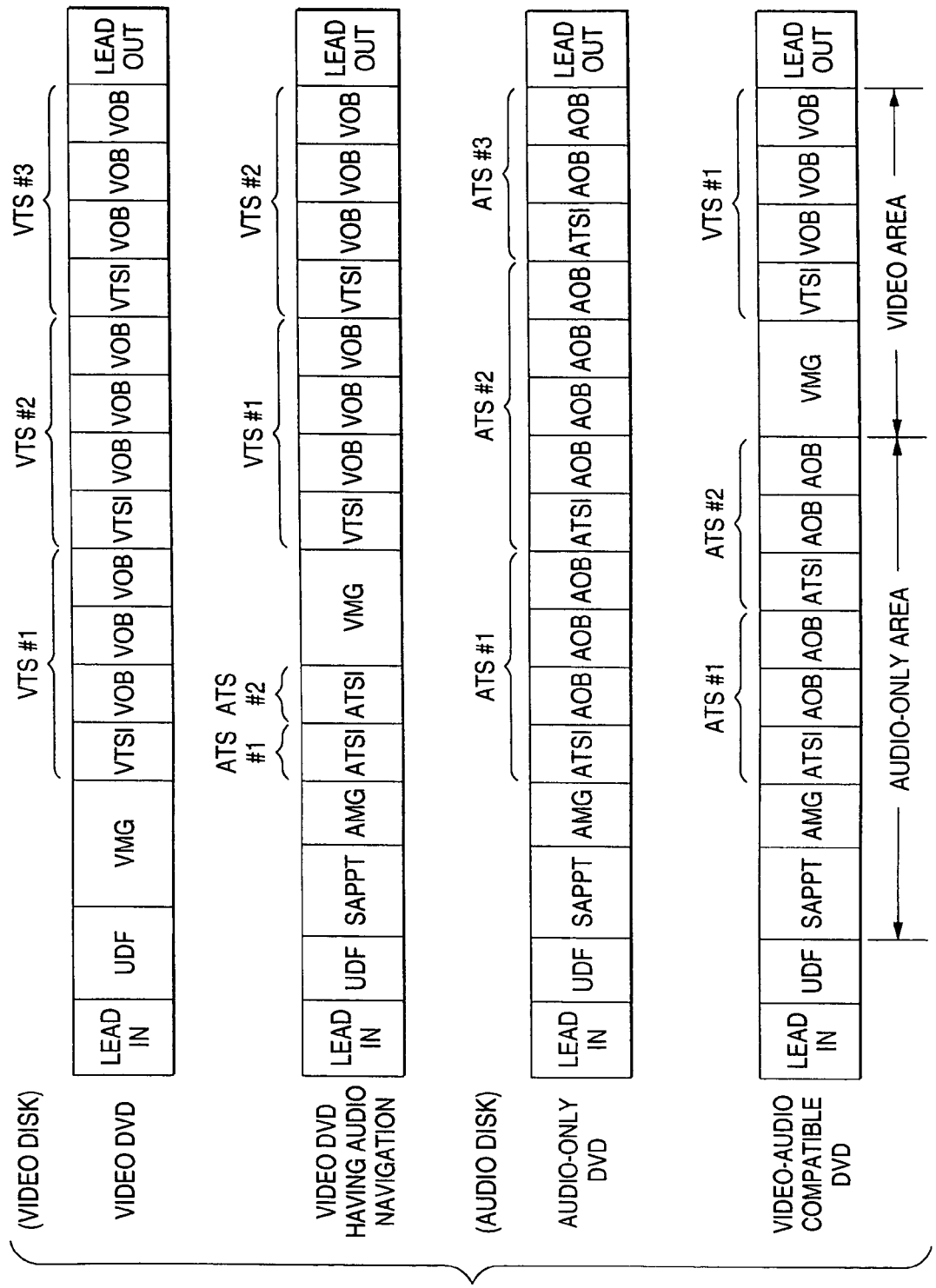
FIG. 5 is a schematic representation showing the types of DVDs.

DVDs for recording AV or audio data comprise four types; namely, a video DVD, a video DVD having audio navigation; an audio-only DVD, and an audio-video compatible DVD. FIG. 5 schematically shows the physical format of each of the four types of DVDs. All these DVDs are identical with one another in terms of a disk shape and a data recording method (i.e., a modulating method, a track pitch, a pit size, etc.) and differ from one another only in terms of contents of information (hereinafter referred to simply as "contents").

(3.1) Video DVD

The top row in FIG. 5 represents a video DVD. Video data recorded according to a DVD video format, such as a movie, and audio data to be reproduced simultaneously with reproduce of the video data (in short, AV data) are recorded on this disk. Accordingly, only a video zone exists in the recording area between the lead-in area LI and the lead-out area LO. The reproduce control information, video data, and audio data are recorded in a plurality of VTSs, and information for controlling the VTSs is recorded as VMG. As has been described with reference to FIG. 1, video data are recorded in the form of video packs, and audio data are recorded in the form of audio packs.

The video DVD is reproduced by a video player or a compatible player on the basis of navigation information (for specifying reproduce control information, which will be described later) included in the management information recorded in the VMG. However, since the navigation information is not recorded according to the DVD audio format, the audio player cannot reproduce the video DVD.

(3.2) Video DVD Having Audio Navigation

The second row shown in FIG. 5 represents one type of video disk, called a video DVD having audio navigation. The video DVD having audio navigation enables reproduce of the video data (including audio data accompanied by the video data) recorded according to the DVD video format, by use of a video player. Further, since the navigation data are also recorded in the video DVD according to the DVD audio format, only the audio data of the AV data recorded in the VOBs within the VTS can be reproduced by use of an audio player. The portion of the AV data that enables the audio player to reproduce only the audio data will be hereinafter referred to as an "audio play portion." The recording format of the video DVD having audio navigation complies with the DVD video format shown in FIG. 1, and AV data are recorded in the form of a plurality of VTSs within the video zone. Further, in the video DVD having audio navigation, each ATSI—which includes the first reproduce control information required for reproducing only the audio data within the VTS pursuant to the DVD audio format—is recorded as an ATS in an audio zone provided in front of the video zone. Furthermore, an AMG is recorded as information for managing the ATS(s). The AOBs constituting a substantial portion of the audio data are not recorded in the ATS. In the AMG and the ATSIs there is described navigation information used when the audio player plays back the audio data [more specifically, the audio play portion packs (see FIG. 1) within each VOB] included in each VTS on the video DVD having audio navigation. The SAPPT including the second reproduce control information is recorded at the head of the audio zone.

A video player or a compatible player plays back the video DVD having audio navigation, on the basis of the navigation information recorded in the VMG and the first reproduce control information recorded in the VTSI (s). The audio data recorded in the audio play portion are reproduced in various patterns according to the capability of the audio player, on the basis of the navigation information recorded in the AMG and the first reproduce control information recorded in the ATSI. The LPC data in the audio play part are reproduced over two channels, on the basis of the management information and the second reproduce control information recorded in the SAPPT, by means of an unsophisticated portable audio player.

(3.3) Audio-Only DVD

The third row represents an audio-only DVD. With the possible exception of a few still images and a small amount of text data, only the audio data, are recorded on this audio-only DVD. Accordingly, only the audio zone pursuant to the DVD audio format is present in the recording area between the lead-in area LI and the lead-out area LO. A plurality of ATSs, each of which comprises an ATSI and AOBs, are recorded in the audio zone, and an AMG including information for managing the ATSs is also recorded in the audio zone. Further, an SAPPT is recorded at the head of the audio zone.

Each of the ATSs comprises one or more AOBs, which constitute(s) a substantial portion of the audio data. In the audio-only DVD, the audio data within the audio zone are reproduced in various reproduce patterns on the basis of the navigation information recorded in the AMG and the first reproduce data recorded in the ATSI, by means of and according to the capabilities of an audio player or a compatible player. Further, the LPC data within the audio zone are reproduced by an unsophisticated portable audio player over two channels on the basis of the management information recorded in the SAPPT and the second reproduce control information.

Since the navigation information is not recorded in the DVD in the DVD video format on the audio-only DVD, the video player cannot reproduce the audio-only DVD.

(3.4) Audio-video Compatible DVD

The bottom row shown in FIG. 5 represents an audio-video compatible DVD. An audio zone and a video zone are provided between the lead-in LI and the lead-out LO. The VMG pursuant to the DVD video format and the VTSs including first reproduce information and substantial AV data (VOBs) are recorded in the video zone, as in the case with the video DVD.

The SAPPT including the second reproduce control information is recorded at the head of the audio zone according to the DVD audio format. As in the case with the audio-only DVD, there are recorded in the audio zone the ATS (ATS #3 in the drawing) that includes only the reproduce information used for reproducing only the audio data of the VOBs serving as the audio play portion within the VTSs of the video zone as well as a plurality of ATSs (ATSs #1 and #2 in the drawing) including the reproduce information and substantial audio data. In the audio-video compatible DVD, the AV data pursuant to the DVD video format and the audio data pursuant to the DVD audio format are separately recorded in different locations.

In the case of the audio-video compatible DVD, the AMG includes information for managing all the ATSs within the audio zone as well as information for managing both all the ATSs and all the VTSs within the video and audio zones. Further, even the SAPPT includes information for managing all the ATSs and all the VTSs within the audio and video zones. The management information included in the SAPPT relates solely to the LPCM data which can be reproduced over two channels in both zones.

The audio-video compatible DVD differs from the video disk having audio navigation and the audio-only DVD in that the recording area of the disk is separated into the audio zone and the video zone, that the AV data pursuant to the DVD video format and the audio data pursuant to the DVD audio format are recorded in the respective zones, and that the AMG and the SAPPT recorded in the audio zone include the information for managing all the ATSs and all the VTSs within the disk.

More specifically, in the video disk having audio navigation, the audio data are recorded in the DVD video format on a per-pack basis within the VOB so as to be superimposed on the video data. The APGCI that is the first reproduce control information for reproducing the audio data recorded in the VOBs constitutes the ATS as the ATSI. The AMG manages solely the ATSs. The information for managing the titles within the video zone is not recorded in the AMG. Similarly, navigation information relating to the audio play part of the video zone is described even in the SAPPT.

In contrast, in the audio-video compatible DVD, the location in which the audio data are recorded in the DVD audio format is separate from the location in which the AV data are recorded in the DVD video format. In the audio zone, the substantial portion of the audio data is recorded in the form of a plurality of AOBs in each ATS according to the DVD audio format shown in FIG. 3. Further, there are recorded two types of ATSs; namely, an ATS formed by recording in the ATSI the APGCI that constitutes information for controlling reproducing the audio data in each of the ATSs, and another ATS formed by recording, as the APGCI in the ATSI, the first reproduce control information for reproducing the audio data recorded in the VOBs in the VTS in the video zone. In other words, regardless of the zone, all the first reproduce control information items for reproducing the audio data are managed by the AMG by way of the ATS.

Of the tracks relevant to reproduce of the LPCM audio data recorded in all the ATSs and in all the VTSs, information relating to the tracks which can be reproduced over two channels is recorded in the SAPPT as second reproduce control information.

The AV data are recorded in the form of a plurality of VTSs in the video zone, and the first reproduce control information for reproducing the AV data in each of the VTSs is recorded as the PGCI in the VTSI. All the VTSs are managed by the VMG. Further, the AMG also manages all the first reproduce control information items relating to the reproduce of the AV data in the video zone. More specifically, in the case of the audio-only DVD and the audio-video compatible DVD, the AMG serves as general management information. In the case of the video DVD, the VMG chiefly serves as management information. In the case of the video DVD having audio navigation, the AMG manages only the reproduce of the audio data (audio titles) within the VOBs by the audio player and does not manage video titles.

In the case of the audio-only DVD and the audio-video compatible DVD, the SAPPT serves as general management information for reproducing the LPCM audio information over two channels by use of the unsophisticated audio player. In the case of the video DVD, since there is no SAPPT, the unsophisticated player cannot reproduce only the audio data even if the audio data are recorded through LPCM. In the case of the video DVD having audio navigation, the SAPPT manages only the reproduce of LPCM audio data (i.e., audio titles) in the audio display part within the VOB by the unsophisticated audio player and does not manage video titles.

By means of the above-described DVD architecture, optimum reproduce of data can be effected according to the capability of the player, and consistent interchangeability between each type of the DVD and a corresponding player can be fulfilled.

(4) Title Reproduce Control

Title reproduce control using the first reproduce control information will now be described in more detail. The title comprises the AV data recorded on the DVD, the substantial data such as audio Data, and the reproduce control information representing the procedures used in reproducing these data sets (see the title 62 shown in FIG. 2 and the title 261 shown in FIG. 4). Specifically, the title represent a series of selections having a common reproduce pattern (i.e., presentation of the selections) or a part of a selection. A title pursuant to the DVD audio format and reproduce control of the title will now be described by reference to an audio-video compatible disk.

(4.1) Types of Titles

The title (e.g., the title 261 shown in FIG. 4) recorded on the audio DVD is classified into an audio title formed by reproduce of the audio data within the audio zone (hereinafter referred to also as an "audio only title (AOTT)," and a video title formed by reproducing the AV data within the video zone. Further, the video title is classified into two types; namely, an image-only title (hereinafter referred to also as an "audio video title (AVTT)," and a video-audio compatible title (hereinafter referred to also as an "audio video title/audio-only title (AVTT/AOTT)." A title pursuant to the DVD video format is only an image-only title (AVTT).

In relation to the AOTT, only the audio data are reproduced. The substantial portion of the audio data is formed from the audio data recorded in the AOBs within the audio zone.

In relation to the AVTT, inevitably the audio data are reproduced in conjunction with the video data. The substantial portion of the audio data is formed from the AV data recorded in the VOBs within the video zone. Reproduce of only the video data of the AVTT is not allowed, and inevitably the audio data are reproduced together with the video data.

In relation to the AVTT/AOTT, only the audio data can be reproduced, and the audio data can be reproduced as the AV data together with the video data (i.e., the AVTT/AOTT can be said to be a compatible title). In either case, the substantial portion of the audio data is formed from the AV data recorded in the VOBs within the video zone. Whether the AVTT/AOTT is reproduced as the AV data or the audio data is dependent on the capability of the player. If an information reproducing apparatus does not have a capability of reproducing AV data (audio player), the player plays back the AVTT/AOTT only as audio data. In contrast, if an information reproducing apparatus has a capability of reproducing AV data (e.g., a video player or a compatible player), the player plays back the AVTT/AOTT as video data in conjunction with audio data.

In the AMG, two navigation information items are separately recorded; namely, navigation information for use with an audio player and navigation information for use with a compatible player. The navigation information for use with an audio player corresponds to an audio title search pointer in which is described navigation information for reproducing only the audio data of the audio title (AOTT) formed from the audio data recorded in the AOBs within the audio zone and only the audio data of the compatible title formed from AV data recorded in the VOBs in the video zone. This audio title search pointer is recorded in an audio-only title search pointer table (AOTT_SRPT). An audio title search pointer, which is navigation information for use with a compatible player capable of reproducing all types of titles, is recorded in an audio title search pointer table (ATT_SRPT). These navigation information items will be described in more detail by reference to FIG. 8.

When the audio-video compatible DVD is reproduced by a video player, the AV data recorded in the individual VTSs are reproduced according to the navigation information for use with a video player recorded in the VMG within the video zone and the PGCI serving as the first reproduce control information recorded in the VTSI. When the audio-video compatible DVD is reproduced by use of the audio player, audio data are reproduced according to the APGCI serving as the first reproduce control information for use with an audio player recorded in the ATSI, by reference to the AOTT_SRPT described in the AMG within the audio zone. In relation to reproduce of the audio data by an audio player, there are two cases. In one case, the audio player plays back the audio data recorded in the AOBs according to the navigation information recorded in the VMG within the video zone and the PGCI serving as the first reproduce control information recorded in the VTSI. In the other case, the audio player plays back the audio-video compatible title (AVTT/AOTT). Specifically, as in the case with a video disk having audio navigation, the audio player plays back the audio data recorded in the VTSs within the video zone according to the navigation information recorded in the AMG within the audio zone and the APGCI serving as the first reproduce control information recorded in the ATSI. In the latter case, the video player plays back an object as AV data accompanied videos, and the audio player plays back only the audio data of the same object.

When a compatible player plays back the audio-video compatible DVD, the audio data recorded in the audio zone and the AV data recorded in the video zone are reproduced in an integrated manner according to the reproduce control information recorded in the ATSI and VTSI while the ATT_SRPT, which serves as navigation information for use with a compatible player and is recorded in the AMG within the audio zone, is referred to. Each title recorded on the audio-video compatible DVD is managed by the AMG and is classified as one of the three types of titles of the DVD audio format.

Figure 6:
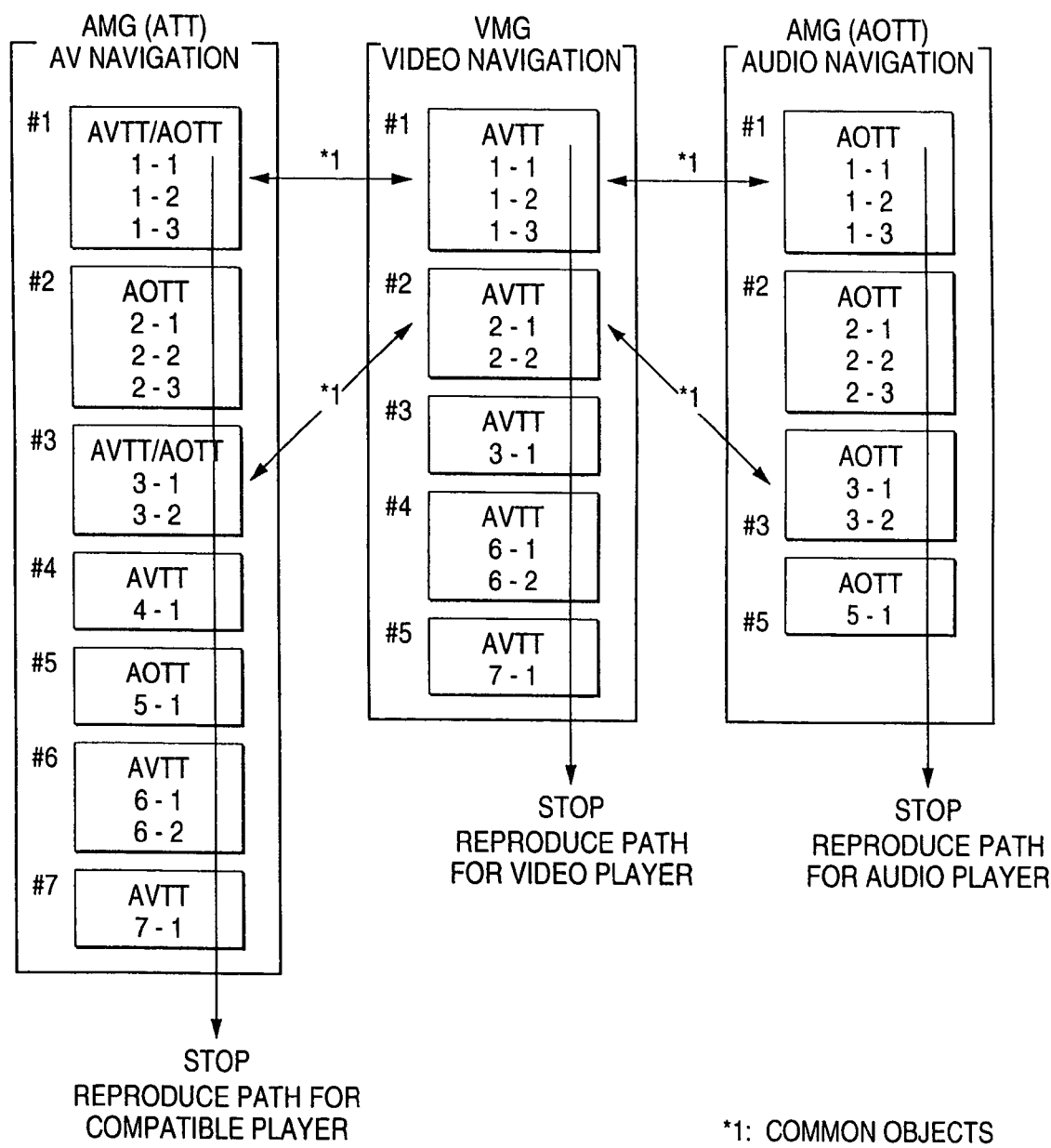
FIG. 6 is a schematic representation showing one example of a video-audio compatible DVD.

Now, there will be described a case where the audio-video compatible DVD having the logical format shown in FIG. 6 is reproduced by use of a compatible player having the capability of reproducing both data pursuant to the DVD audio format and data pursuant to the DVD video format. In the audio-video compatible DVD, the volume comprises seven title groups ranging from #1 to #7, and each title group comprises one title. Further, a single title comprises one or a plurality of tracks. In FIG. 6, the left column schematically represents navigation information (ATT_SRPT) for use with a compatible player; the center column schematically represents the navigation information (TT_SRPT) for use with the video player; and the right column schematically represents navigation information for use with the audio player (AOTT_SRPT).

Titles #2 and #5 represent AOTTs. At the time of reproduce of these titles, only the audio data recorded in the AOBs within the audio zone of the audio-video compatible DVD are reproduced. Titles #4, #6, and #7 represent AVTTs. At the time of reproduce of these titles, the AV data recorded in the VOBs within the video zone of the audio-video compatible DVD are reproduced. Accordingly, video and audio selections are inevitably reproduced. Titles #1 and #3 represent AVTT/AOTTs. At the time of reproduce of these titles, the compatible player plays back both audio and video data, on the basis of the video and audio information items recorded in the VOBs within the video zone of the audio-video compatible DVD.

When an audio player having no capability of reproducing video data plays back titles #1 and #3, only the audio data recorded in the VOBs within the video zone on the audio-video compatible DVD are reproduced (see the right column shown in FIG. 6). More specifically, the AVTT/AOTT title is prepared such that the data recorded under this title are reproduced under a method which enables delivery of maximum performance of the player used for reproducing the DVD disk according to the capacity thereof.

In order to avoid confusion that could otherwise arise at the time of reproduce of the title group, by agreement the AVTT cannot constitute a title group along with titles of another type (such as AOTT and AVTT/AOTT).

(4.2) Dual Management of VOB

An explanation will be given of the concept of the PGCI and APGCI specified in relation to the VOBs within the video zone of the audio-video compatible DVD. The video and audio data are recorded in the VOBs while they are multiplexed. The data recorded in the VOBs are reproduced according to the PGCI, so that the data are reproduced as AV data. Such reproduce of data is identical in concept with reproduce of the data recorded on the video DVD. As mentioned above, the way in which AV data are recorded on and reproduced from the audio DVD is set so as to comply with the video format, hence maintaining the interchangeability between the video player and the audio DVD. In contrast, when only the audio data recorded in the VOBs are reproduced, the data are reproduced according to the APGCI specified independently of the PGCI. Reproduce of the audio data according to the APGCI will now be described by reference to FIG. 7.

Figure 7:
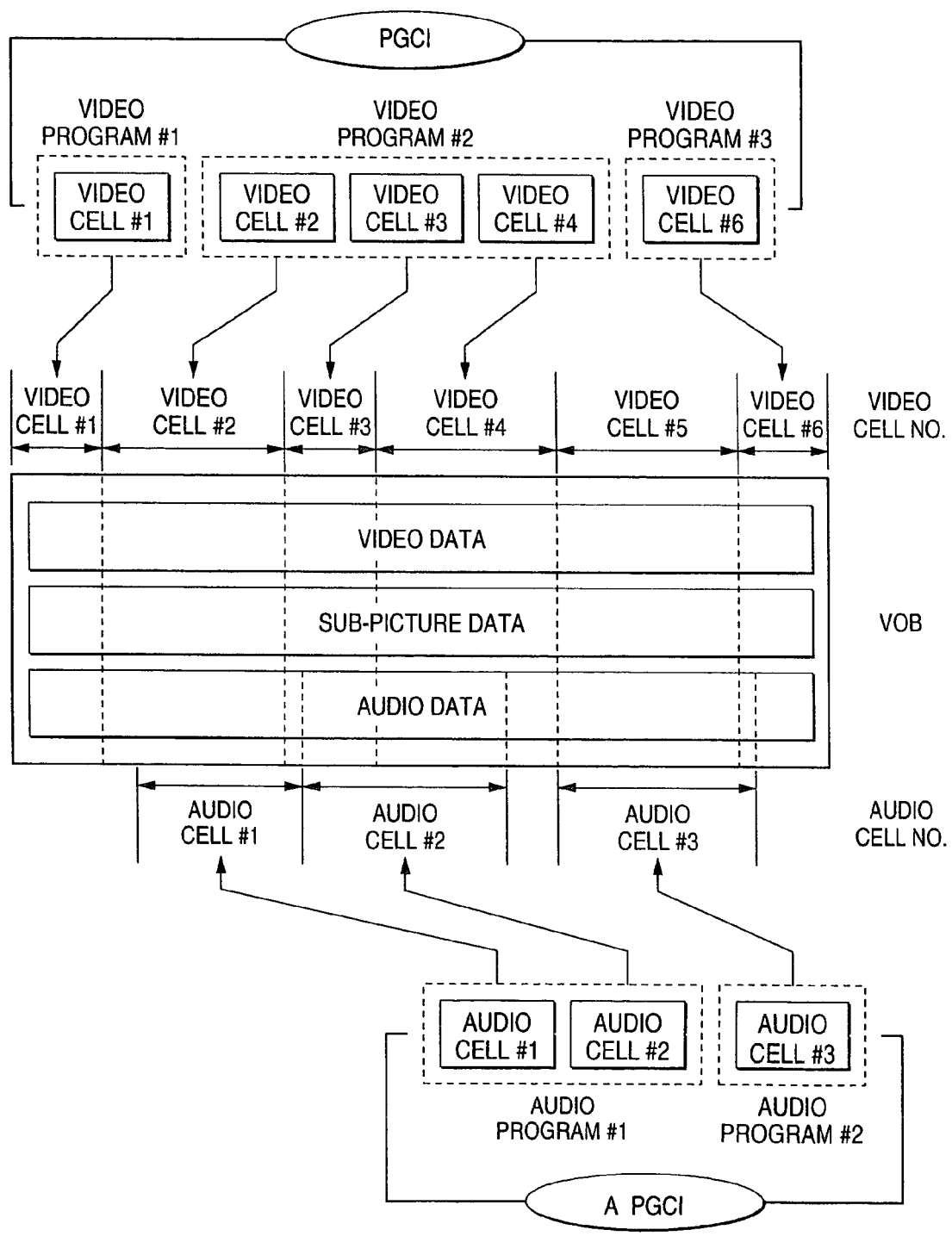
FIG. 7 is a schematic representation showing the concept of double management of the same object.

FIG. 7 schematically shows programs in a case where the data recorded in one VOB are reproduced as AV data according to PGCI and in a case where the data are reproduced as only audio data according to APGCI. In FIG. 7, the VOB comprises video data, sub-picture data, and audio data. When the data recorded in the VOB are reproduced as AV data, reproduce of the data is controlled according to the PGCI. According to the PGCI, the VOB is separated into six video cells #1 to #6. Video program #1 is formed from video cell #1; video program #2 is formed from video cells #2 to #4; and video program #3 is formed from video cell #6. Like the case of AVTT/AOTT, when the AV data are reproduced by use of a video player and a compatible player, AV data are reproduced according to the PGCI.

When the audio player plays back only the audio data from the same VOB, the audio data are reproduced according to the APGCI. The audio program defined by the AGPCI is formed from one or 2 or more audio cells. Even for the same object (VOB), audio cells can be defined so as to differ from (or become independent of) video cells (as a matter of course, audio cells maybe defined so as to become match video cells). Specifically, the start and end positions of each audio cell can be set independently of those of the video cell. Further, the sequence defined by the APGCI in which audio cells are reproduced may be defined independently of the sequence defined by the PGCI in which video cells are reproduced.

In the example shown in FIG. 7, the audio program #1 is formed from the audio cells #1 and #2, and the audio program #2 is formed from the audio cell #3. The APGCI comprises the information relating to the recording positions of the audio cells included in the audio program and the sequence in which the audio cells are reproduced. On the basis of the APGCI, the audio data are reproduced.

Thus, the reason why the audio cells can be defined independently of the video cells is that the audio data and the AV data are managed independently of each other. As a result, when only the audio data recorded in the VOB are reproduced, time control can be effected independently of time control relating to AV data. Even when only the audio data of the AV data are reproduced, the substantial portion of the audio data can be reproduced. As a matter of course, the audio cells may be defined so as to become identical with the video cells.

(4.3) First Reproduce Control Information

Reproduce control of each of the previously-described titles recorded on the audio-video compatible DVD by use of first reproduce control will now be described by reference to FIGS. 6 and 8. The first reproduce control information refers to the ATT_SRPT and AOTT_SRPT recorded in the AMG, the TT_SRPT recorded in the VMG, the APGCI recorded in the ATS, and the PGCI recorded in the VTS.

Figure 8:
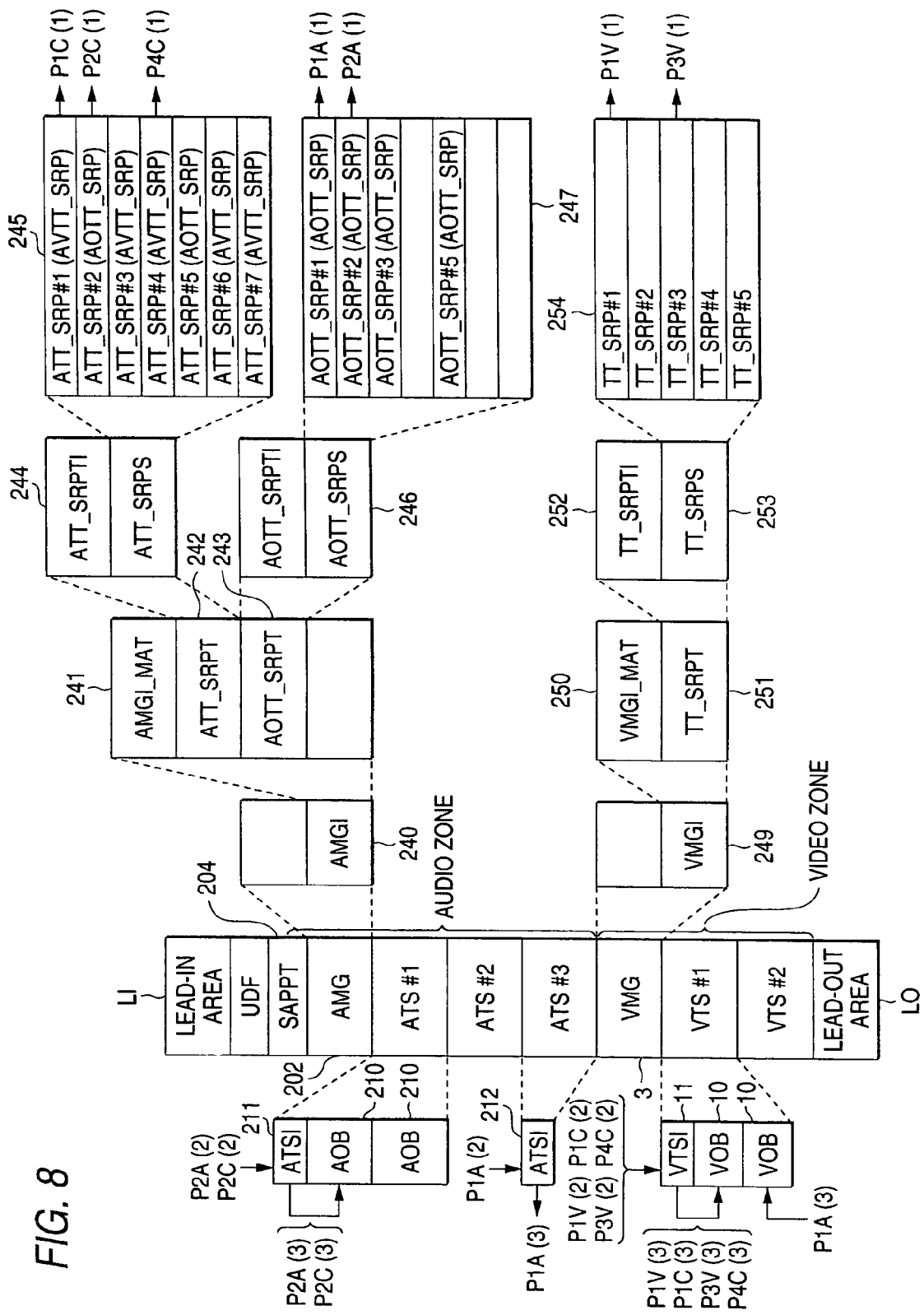
FIG. 8 is a schematic representation showing an example of navigation information specified for the video-audio compatible DVD shown in FIG. 6.

FIG. 8 represents an example of navigation data recorded on the audio-video compatible DVD. As mentioned previously, the audio-video compatible DVD comprises a video zone pursuant to the DVD video format and an audio zone pursuant to the DVD audio format. The data that can be reproduced from the audio-video are AV data (video data including audio) such as a movie and audio data. Navigation information items for the purpose of preventing chaos or contradiction from arising when data are reproduced by a corresponding type of an information reproducing apparatus are recorded on the audio-video compatible DVD independently of one another so as to correspond to individual types of players.

(4.3.1) AMG, ATSI, Title Search Pointer Table

As shown in FIG. 8, the audio-video compatible DVD comprises an audio zone and a video zone. The audio zone comprises the SAPPT 204, the AMG 202, the ATS#1, the ATS#2, and the ATS#3. The ATS#1 is made up of the ATSI 211 and AOBs 210, and the ATS#3 is made up of only the ATSI 212. Furthers the video zone comprises the VMG 3, the VTS#1, and the VTS#2. The VST#1 comprises the VTSI 11 and the VOBs 10.

The AMG 202 includes the AMGT (AMG Information) 240 that is a substantial portion of the navigation information. The AMGI 240 comprises an AMGI management table 241 including information relating to the file size and the recording address of the AMGI 240; an ATT search pointer table 242; and an AOTT search pointer table 243. The ATT is a generic name of an audio title (AOTT) formed from only the audio data, an image-only title (AVTT) formed from AV data, and an image-audio compatible title (AVTT/AOTT) formed from AV data.

The search point indicates the location on the DVD where the reproduce control information relating to each title (corresponding to the APGCI and PGCI in this example) is recorded. As mentioned previously, each title comprises substantial data such as audio data and AV data, and reproduce control information for reproducing the substantial data in combination. The reproduce control information is recorded in the ATSI within the ATS or in the VTSI within the VTS. The search pointer indicates the location within the ATSI or VTSI where the reproduce control information of each title is recorded. The navigation information serves to control reproduce of each title. In the present embodiment, the navigation information corresponds to a concept including the previously-described search pointer.

In the ATT search pointer table 242 is described navigation information used when a compatible player plays back individual titles recorded on the audio-video compatible DVD. In the AOTT search pointer table 243, there is described navigation information used when an audio player plays back individual titles recorded on the audio-video compatible DVD. There is a one-to-one correspondence between the audio search pointer table 242 and the AOTT search pointer table 243. The number of search pointers described in the ATT search pointer table matches the number of all the titles included in the audio-video compatible DVD. For example, as shown in FIG. 6, if a total of seven titles are included in the audio-video compatible DVD, search pointers corresponding to the respective titles are described in the ATT search pointer table 242. Regardless of the types of titles, a frame for describing seven search pointers is prepared even in the AOTT search pointer table 243. There is also a one-to-one correspondence between the frames of the tables.

(4.3.1.1) ATT_SRP

The audio title search pointer (ATT_SRP) serves as navigation information used when the audio-video compatible DVD is reproduced by a compatible player. When the audio-video compatible DVD is loaded, the compatible player plays back individual titles by reference to the ATT_SRP. The example of navigation information shown in FIG. 8 corresponds to the example of the audio-video compatible DVD shown in FIG. 6. Titles #1 and #2 correspond to a video-audio compatible title (AVTT/AOTT); titles #2 and #5 correspond to an audio title (AOTT); and titles #4, #6, and #7 correspond to an image-only title (AVTT).

As has been described previously, three types of titles (AOTT, AVTT/AOTT, and AVTT) can be recorded on the audio-video compatible DVD. Consequently, in the audio-video compatible DVD, for each of the three types of titles (i.e., AOTT, AVTT/AOTT, and AVTT), a corresponding search pointer is described in the ATT search pointer table 242 of the AMG.

However, title search pointers 245 actually written into the ATT search pointer table 242 shown in FIG. 8 correspond to only audio title search pointers (AOTT_SRP) or video-only title search pointers (AVTT_SRP). Title search pointers relating to the image-audio compatible titles (AVTT_AOTT) are written into the ATT search pointer table 242 as video-only title search pointers (AVTT_SRP) (in the table shown in FIG. 8, actual descriptions are enclosed in parentheses). The reason for this is that the compatible player is not required to distinguish the video-audio compatible titles (AVTT/AOTT) from the video-only titles (AVTT). More specifically, the compatible player has the capability of reproducing data pursuant to the DVD video format and plays back all the video-audio compatible titles as video data. Accordingly, in light of navigation information, the compatible player is not required to distinguish the video-only title search pointers (AVTT_SRP) relating to the video-only title (AVTT) from the video-only title search pointers (AVTT_SRP) relating to the video-audio compatible title (AVTT/AOTT). For this reason, search pointers relating to all the titles associated with reproduce of a video are described in the form of a common format, i.e., a video-only title search pointer (AVTT_SRP).

As can be seen from comparison of the left column shown in FIG. 6 with the audio title search pointer table shown in FIG. 8, in the ATT search pointer table 242 in which the navigation information for use with a compatible player is described, the video-only title search pointer (AVTT_SRP) is described for the video-only titles (titles #4, #6, and #7) and the video-audio compatible titles (titles #1 and #3). For the audio titles (titles #2 and #5), an audio search title pointer (AOTT_SRP) is described in the ATT search pointer table 242. As represented by the left column shown in FIG. 6, the compatible player plays back the titles #1, #3, #4, #6, and #7 as AV data and plays back the titles #2 and #5 as audio data, by reference to the ATT search pointer table 242.

(4.3.1.2) AOTT_SRP

An audio title search pointer (AOTT_SRP) serving as navigation information for use with an audio player is described in the AOTT search pointer table 243. When the video-audio compatible DVD is loaded, the audio player plays back the DVD by reference to the AOTT search pointer table 243.

Search pointers relating to the audio titles (AOTT) and the video-audio compatible titles (AVTT/AOTT) are written in the AOTT search pointer table 243. Since the audio player does not have any capacity of reproducing AV data, there is no need to describe the search pointer relating to the video-only title (AVTT). However, only the AOTT search pointer (AOTT_SRP) is actually written in the AOTT search pointer table 243. The audio player requires only the information specifying whether or not the title enables reproduce of only audio data, and does not require a distinction between the audio title (AOTT) and the video-audio compatible title (AVTT/AOTT). Accordingly, in the audio-only title search pointer table (AOTT_SRPT) 243, the audio title (AOTT) is not distinguished from the video-audio compatible title (AVTT/AOTT), and search pointers relating to all the titles are written in a common format, i.e., the AOTT search pointer (AOTT_SRP). As a result, for the video-audio compatible titles (AVTT/AOTT), the video-only title search pointers (AVTT_SRP) are written in the ATT search pointer table 242, and the audio title search pointers (AOTT_SRP) are described in the AOTT search pointer table 243.

Although only the frame to be used for describing the title search pointers is available for the video-only titles (AVTT), substantial information is not described, or it is written that the titles are not assigned the AOTT_SRP (i.e., the titles do not permit reproduce of only audio data). The reasons for this are that navigation information for use with an audio player is written in the AOTT search pointer table 243 and that the audio player cannot reproduce AV data. The audio player determines that the data relating to the titles cannot be reproduced and disregards the titles.

The audio player plays back the data provided in the right column shown in FIG. 6 by reference to the AOTT title search pointer table 243 that has been described previously. More specifically, the audio player disregards the video-only titles #4, #6, and #7 and plays back the data relating to the titles #1, #2, #3, and #5.

(4.3.2) VMG, VTSI, and Title Search Pointer

The VMG3 includes the VMGI (VMG Information), which is a substantial portion of the navigation information. The VMGI comprises a VMGI management table 250 including the file size and recording address of the VMGI, and a title search pointer table (TT_SRPT) 251. Navigation information regarding the video player is written in The title search pointer table 251. The video player plays back the title according to the procedure determined in the conventional DVD video formation, by reference to the title search pointer table (TT_SRPT) 251. The term "title" used herein comprises two types of titles; namely, a video-audio compatible title (AVTT/AOTT) and a video-only title (AVTT). These two types of titles are not distinguished from each other in the title search pointer table (TT_SRPT) 251, wherein all the titles are written as TT_SRP As mentioned previously, in the audio-video compatible DVD, there are prepared navigation information sets optimized for the audio player, the video player, and the compatible player, respectively. These navigation information sets are recorded as three independent title search pointer tables, thereby enabling optimum reproduce of data according to the capability of each player.

(4.4) Structure of Search Pointer Table

The structure of the search pointer table will now be described in more detail.

(4.4.1) ATT_SRPT, AOTT_SRPT, and TT_SRPT

The ATT search pointer table 242 includes ATT search pointer information (ATT_ARPTI) 244 including the number of ATT search pointers and a plurality of ATT search pointers 245 (many types of search pointers 245 are collectively written as ATT_SRPS in FIG. 8). In FIG. 8, the descriptions in parentheses represent the types of search pointer written as actual search pointers. As mentioned previously, either AOTT_SRP or AVTT_SRP is written as a search pointer in the ATT search pointer table 242.

By reference to FIGS. 6 and 8, methods of reproducing the three types of titles which can be recorded on the audio-video compatible DVD will be described while they are classified according to the types of players capable of reproducing the titles.

Similarly, the AOTT search pointer table 243 includes AOTT search pointer (AOTT_ARPTI) information 246 including the number of AOTT search pointers and a plurality of search pointers 247 (collectively written as AOTT_SRPS in FIG. 8). In FIG. 8, the description in parentheses relating to each AOTT search pointer represents the type of search pointer to be actually written as the search pointer. As mentioned previously, in the AOTT search pointer table 243 all the search pointers are written as AOTT_SRPT.

The ATT search pointer and the AOTT search pointer, both of which specify the same title, must be located at corresponding positions on the respective search pointer tables. There is a one-to-one correspondence between the ATT search pointer written in the ATT search pointer table 242 and the AOTT search pointer written in the AOTT search pointer table 243. For example, ATT_SRPT#1 and AOTT_SRPT#1 specify the same title.

Similarly, the TT search pointer table 251 includes TT search pointer information (TT_SRPTI) 252 including the number of TT search pointers, and a plurality of TT search pointers 254 (collectively written as TT_SRPS in FIG. 8).

Although there is one-to-one correspondence between the ATT search pointer 245 and the AOTT-search pointer 247, there is not necessarily one-to-one correspondence between these pointers and the TT search pointer. However, the TT search pointer also indicates reproduce procedures by indication of the PGC that logically constitutes a title to be reproduced. In this respect, the TT search pointer is identical with the ATT search pointer and the AOTT search pointer.

(4.5) Method of Reproducing Individual Titles by Use of First Reproduce Control Information Methods of reproducing three types of titles which can be recorded on the-video-audio compatible DVD will be described by reference to FIGS. 6 and 8, and the types of players capable of reproducing titles will be specified.

(4.5.1) Method of Reproducing Audio Title (AOTT)

An audio player or a compatible player can reproduce the AOTT. The AOTT is a title used for reproducing audio data, and the second reproduce control information SAPPT is also designated for reproduce of AOTT. However, the second reproduce control information is formed from only the information required for fulfilling only a portion of reproduce patterns of AOTT. In contrast, the first reproduce control information is structured to permit description of all the required information items so that all the reproduce patterns relating to the DVD audio format can be realized. The primary reproduce pattern (or function) of the audio title achieved by the first reproduce control information also includes the reproduce pattern which can be achieved during reproduce of the video-audio compatible title (AVTT_AOTT) by the audio player.

Multi-Channel Reproduce

In the DVD audio format, the LPCM audio information of the video zone offers a maximum of eight channels. A maximum of six channels are available as discrete multi-channels. In this case, a total of 24 patterns can be set for each of the multi-channels; namely, eleven patterns determined for each channel through combination of three front channels, two rear channels, and a sub-woofer; and thirteen patterns determined for each channel through combination of a discrete multi-channel and a two-channel reproduce signal. The LPCM audio data in the audio zone can offer a maximum of six channels, and twenty-one patterns are available for each of the channels by combination of three front channels, two rear channels, and a sub-woofer.

Two-channel Reproduce

LPCM audio data of two channels or less are reproduced, exactly as they are. Multi-channel LPCM audio data in the video zone are reproduced only over two channels CH0 and CH1, and multi-channel LPCM audio data in the audio zone are down-mixed and reproduced over two channels, on the basis of down-mix coefficients defined independently on a per-track basis.

Audio Selection

According to the DVD audio format, the audio information in two different types of formats is defined as a single title and can be selected by the user. This function will be called audio selection. More specifically, the user can choose a different reproduce pattern for the same musical selection, from a two-channel reproduce pattern and a multi-channel reproduce pattern. Further, in addition being able to choose between the two-channel reproduce pattern and the multi-channel reproduce pattern, the viewer can make a choice for the same musical selection, from LPCM recorded audio data and the audio data recorded according to another coding scheme (e.g., compressed audio selection or one-bit audio selection).

Change in Attribute on Per-Musical-Selection Basis

The DVD audio format permits a change in the sampling frequency fs, the number of bits to be quantized Qb, and the number of channels on a per-musical-selection basis. Musical selections possessing different attributes are continuously reproduced, but a mute signal arises during an interval between these music selections in order to correspond to a change in attribute.

Audio Coding Mode

An audio coding mode represents the type of coding scheme at the time of recording of audio data. The audio coding mode comprises LPCM, Dolby AC3, MPEG audio, DTS, and SDDS. Of these coding modes, LPCM, which is also used for compact disks, is well known. The remaining coding modes are included in one type of compression/encoding scheme.

Multi-Channel Type

A multi-channel type represents the type of a multi-channel record of LPCM according to the DVD audio format. Type 1 enables setting of a maximum of six channels. Even the layout of speakers can be set for each channel from among combinations of three front channels, two rear channels, and a sub-woofer.

Channel Assignment

In relation to the multi-channel LPCM, there will now be described the number of channels, the relationship between each of the channels and the layout of output speakers, and the relationship between each channel and a channel group. For example, provided that a three-channel signal is recorded on a DVD, CH0 (Left Front Speaker) represents a signal which is output from the left front speaker and is included in a channel group 1; CH1 (Right Front Speaker) represents a signal which is output from the right front speaker and is included in the channel group 1; and CH2 (Surround Speaker) represents a signal which is output from surround speakers and is included in a channel group 2. As mentioned previously, if the multi-channel is of type 1, 21 patterns are available by combination of the front three channels, the rear two channels, and a sub-woofer. Channel assignment information designates the type of combination pattern among the 21 patterns.

Multi-Stream Reproduce

The substantial portion of audio data recorded in the audio zone according to the DVD audio format is recorded as only one audio stream. In contrast, the substantial portion of video data recorded in the video zone is recorded in the VOB in conjunction with video streams while being multiplexed on a per-pack basis. Within a range of limited transfer rate, the VOB can multiplex a plurality of audio streams into a single audio stream. For instance, the VOB enables multiplexing of a 2-channel/LPCM audio stream and a multi-channel/LPCM audio stream into a single audio stream or multiplexing of a 2-channel LPCM audio stream and an AC-3 compressed audio stream into a single audio stream. The user can choose between these two audio streams having different reproduce patterns, through designation of an audio selection value.

Down-Mix Reproduce

In some case, only the discrete multi-channel portion of the multi-channel LPCM information pursuant to the DVD audio format is recorded. In this case, a two-channel reproduce signal is not recorded. When the player plays back a multi-channel signal, no problem arises. However, if the multi-channel signal is reproduced over only two channels, i.e., CH0 and CH1, only a portion of a track is output. For reproducing, over two channels, all the sound signals recorded over multi-channels, all the recorded channel signals are down-mixed into L-mix and R-mix signals according to down-mix coefficients. The thus-mixed L-mix and R-mixed signals are reproduced over two channels. These operations are called down-mix reproduce.

Reproduce of Scalable Record

The multi-channel LPCM data pursuant to the DVD audio format are recorded separately in two groups; i.e., a channel group 1 and a channel group 2. A sampling frequency and the number of bits to be quantized may be set differently from one channel group to another. The channel group 1 is determined so as to be assigned a larger sampling frequency and a larger number of bits to be quantized as compared with the case of the channel group 2.

Reproduce of Float-Recording of Channel_Group_#2

The multi-channel LPCM data pursuant to the DVD audio format are recorded separately in two groups. The channel group 1 is determined so as to be assigned a larger sampling frequency and a larger number of bits to be quantized as compared with the case of the channel group 2. For example, the channel group 1 is assigned fs=96 kHz and Qb=24 bits; and the channel group 2 is assigned fs=48 kHz and Qb=16 bits. If two signals having different numbers of bits to be quantized are simultaneously reproduced over multi-channels or reproduced over two channels through down-mix processes, the noise level of the signal having the smaller number of bits to be quantized becomes predominant. In spite of the fact that the channel group 1 has 24 bits of dynamic range, a resultant multi-channel assumes 16 bits of dynamic range. The reason for this is that signals of each channel group are reproduced with reference to MSB. However, the foregoing problem can be solved by reproducing the signals so as to assume the same number of bits as assumed by the signal having the smallest number of bits to be quantized, thereby reducing the level of quantization. For these reasons, the signals belonging to the channel group 2 are float-recorded. More specifically, in relation to the signals belonging to the channel group 2, there are determined the number of bits to be quantized and the number of bits by which the level of quantization is reduced.

Title Group Selection

In relation to the DVD audio format, a title group is the maximum unit which the user can select and instruct to the player. The user perceives the title group as a set of musical selections (or tracks). Although a title group is a set of titles, the user does not perceive the titles themselves. For instance, provided that ten tracks of only music data are first reproduced and that reproduce of two tracks involving video data follows, the first ten tracks constitute title 1, and the subsequent two tracks constitute title 2. However, the numbers assigned to the tracks are serial numbers in the title group. If the user desires to first reproduce the tracks involving video data, the user selects track 11 but not track 1 of title 2.

Track Selection

In the DVD audio format, a track is a unit which the user can select and instruct to the player. The track corresponds to one musical selection or chapter.

Index Selection

In the DVD audio format, an index is the minimum unit which the user can select and instruct to the player. The index is a unit formed by further segmentation of a musical selection (or track). Therefore, the index can be used relatively freely. A single index may be assigned so as to correspond to track numbers (No. 1, No. 2, . . . ) within a single musical selection. Alternatively, a plurality of indices may be assigned so as to correspond to the same track numbers within the same musical selection. Indices may be assigned to a prelude, an interlude, an ending, and a climax of a track (track number), thereby enabling the user to give an instruction for any of various reproduce patterns.

Indication of Title Group Time

Control and indication of an overall length of time of a title group, an elapsed time relating to a title group (i.e., a current time), and a remaining time. To enable control of these times, times are described in the first reproduce control information on a per-unit basis.

Indication of Track Time

Control and indication of an overall length of time of a track, an elapsed time relating to a track (i.e., a current time), and a remaining time. To enable control of these times, times are described in the first reproduce control information on a per-unit basis.

Indication of Index Time

Control and indication of an overall length of time of an index, an elapsed time relating to an index (i.e., a current time), and a remaining time. To enable control of these times, times are described in the first reproduce control information on a per-unit basis.

Spotlight Reproduce

A reproduce pattern which permits the player to selectively reproduce a climatic portion of a musical selection (or track). A plurality of indices are determined within a track. The indices assigned to climatic portions are determined such that the segments specified by the indices correspond to spotlight segments, thereby enabling the player to reproduce solely specified indices.

Reproduce Using Reproduce Control Command

The purpose of this type of reproduce is to fulfill interactive reproduce patterns.

Reproduce Using Text Data

The DVD audio format enables recording of two types of text data. One type of text data is intensive text data used for intensively controlling text relating to the overall DVD, as well as for indicating and retrieving a track. Another type of text data is real-time text data to be multiplexed into the audio data. The latter type of text data is used for indicating the words and title of the track during reproduce.

(4.5.1.1) Audio Player

A method by which an audio player plays back an audio title (AOTT) will be first described. As mentioned previously, the audio player refers to solely AOTT_SRPT 243 serving as navigation information. In FIG. 6, AOTT represent titles #2 and #5. When reproducing the title #2, the audio player refers to AOTT_SRP#2, thereby including the title #2. An ATS number (ATS#1 in this case) and a title number in that ATS [see a path represented by P2A(1) shown in FIG. 8] are read. By reference to corresponding ATSI 211 of ATS#1 [see a path represented by P2A(2) shown in FIG. 8], the APGCI to which the title corresponds is selected by use of a title number within the previously-described ATS. During reproduce, the audio player plays back the audio pack 43 within the AOB 210 according to the APGCI specified by the AOTT_SRP#2, thereby reproducing audio data [see a path represented by P2A(3) shown in FIG. 8].

(4.5.1.2) Compatible Player

A method by which a compatible player plays back an audio title (AOTT) will now be described. The compatible player refers to ATT_SRPT 242 serving as navigation information. In FIG. 6, AOTT represents titles #2 and #5. When the compatible player plays back the title #2, ATT_SRP#2 is referred to. Since the ATT_SRP#2 corresponds to AOTT_SRPT, the compatible player perceives the title as AOTT. As in the case with the audio player, the title #2 is included. An ATS number (ATS#1 in this case) and a title number in that ATS [see a path represented by P2C(1) shown in FIG. 8] are read. By reference to corresponding ATSI 211 of ATS#1 [see a path represented by P2C(2) shown in FIG. 8], the APGCI to which the title corresponds is selected by use of a title number within the previously-described ATS. During reproduce, the compatible player plays back the audio pack 43 within the AOB 210 according to the APGCI specified by the AOTT_SRPT#2, thereby reproducing audio data [see a path represented by P2C(3) shown in FIG. 8].

(4.5.2) Image-Only Title (AVTT)

A path for reproducing an image-only title will now be described. The image-only title can be reproduced by a video player or a compatible player.

(4.5.2.1) Video Player

Referring to TT_SRPT (a title search pointer table) 251 as navigation information, a video player performs reproduce according to reproduce procedures pursuant to the DVD video format. First, the video player refers to the title search pointer table 251 of the VMG 3. Here, there is no requirement for one-to-one correspondence between the positions on the individual title search pointer tables 242 and 243 of the corresponding titles in audio navigation where the search pointers are described and the positions on the title search pointer table 241 of the VMG 3 where the title search pointers are described. More specifically, the titles written in the ATT search pointer table 242 of the AMGI, the sequence in which these titles are written, the titles written in the TT search pointer, and the sequence in which these titles are written may be independently defined.

To avoid confusion, if a title corresponding to the TT_SRP 254 of the VMGI is not written into the title search pointer table 251, in principle the title is written into the TT search pointer table so as to write the information in a more compact manner. For this reason, the title number may become different, as show in FIG. 8. More specifically, although seven titles are written in the audio-video compatible DVD shown in FIG. 6, the video player does not reproduce the titles #2 and #5, which are AOTTs. In relation to the five titles (titles #1, #3, #4, #6, and #7) remaining after removal of the titles #2 and #5, TT_SRPs are written in the title search pointer table 251. TT_SRPs #1 to #5 written in the title search pointer table 251 correspond to the titles #1, #2, #3, #4, and #5 that are written in the center column shown in FIG. 6 and are controlled by the VMG.

The TT_SRP 254 represents a PGC logically constituting a corresponding title. The video player reads from the search pointer a VTS number including the title (VTS #1 in this example) and a title number from the VTS [see a path represented by P3V(1) shown in FIG. 8]. Next, by reference to VTSI 11 of the. corresponding VTS #1 [see a path represented by P3V(2) shown in FIG. 8], the video player reads the PGCI corresponding to the title, by use of the title number within the previously-described VTS. As a result, the video player acquires the PGCI and plays back the title as AV data by use of video and audio packs recorded in the VOB [see a path represented by P3V(3) shown in FIG. 8].

(4.5.2.2) Compatible Player

An explanation will now be given of a case where a compatible player plays back a video-only title (AVTT). The compatible player refers only to the ATT_SRPT 242 as navigation information. The video-only title (AVTT) shown in FIG. 6 corresponds to titles #4, #6, and #7. When reproducing the title #4, the compatible player refers to the ATT_SRP #4, which is an AVTT_SRP. As a result, the compatible player perceives the title as a video-only title. As mentioned previously, the title number of the video-only title does not match the title number referred to by the video player. However, in subsequent processes, as in the case with the video player reading a VTS number and a title number from the TT_SRP, the compatible player reads from the ATT_SRP 245 the VTS number including the title (VTS #1 in this example) and a title number within the VTS [(see a path designated by P4C(1) shown in FIG. 8 ]. By reference to the VTSI 11 of the corresponding VTS #1 [see a path indicated by P4C(2) shown in FIG. 8], the compatible player reads a PGCI corresponding to the title, by use of a title number within the VTS. The compatible player acquires the PGCI and plays back the title as AV data by use of a video pack and an audio pack recorded in the VOB [see a path designated by P4C(3) shown in FIG. 8].

(4.5.2.3) Audio Player

An explanation will be given of a case where an audio player plays back the video-only title. The audio player refers to solely the AOTT_SRPT 243 as navigation information. Since a relevant AOTT is not written in the navigation information, the audio player aborts a reproduce operation (since no description appears in the area where AOTT_SPR #4 is written in FIG. 8, the audio player aborts reproduce of the video-only title).

(4.5.3) Video-Audio Compatible Title (AVTT/AOTT)

Video-Audio Compatible Title is reproduced by the whole players of an audio player, a video player, and a compatible player. Therefore, an explanation is given in this order.

First, an explanation is given of a method by which an audio player plays back a video-audio compatible title. The audio player refers to solely the AOTT_SRPT 243 as navigation information. In FIG. 6, the video-audio compatible title (AVTT/AOTT) corresponds to titles #1 and #3. Hence, when reproducing the title #1, the audio player refers to AOTT_SRP #1 and reads an ATS number including the title (ATS #3 in this case) and a title number within the ATS [see a path designated by P1A(1) shown in FIG. 8]. Next, by reference to ATSI 212 of the relevant ATS #3 [see a path designated by P1A(2) shown in FIG. 8], the audio player reads an APGCI corresponding to the title by use of the title number in the ATS. Here, the ATS#3 does not include any substantial portion of the audio data, and the APGCI represents a procedure through which an audio pack recorded in the VOB 10 of the VTS #1 is reproduced. Accordingly, the audio player plays back only the audio pack recorded in the VOB 10 according to the APGCI, thereby reproducing only the audio data [see a path designated by P1A(3) shown in FIG. 8].

(4.5.3.2) Video Player

An explanation will now be given of a case where a video player plays back a video-audio compatible title.

As mentioned previously, regardless of the type of a disk, the video player performs reproduce through a reproduce procedure corresponding to the video format. Therefore, the video player first refers to the title search pointer table 251 of the VMG 3. Here, the title number is #1 and matches the title number of audio navigation. A path followed subsequent to this step is the same as that described in section (5.2.1), and hence repetition of its explanation is omitted here [see the paths designated by P1(1), P1V(2), and P1V(3) shown in FIG. 8].

(4.5.3.3) Compatible Player

An explanation will be given of a case where a compatible player plays back a video-audio compatible title. The compatible player refers to solely the ATT_SRPT 242 as navigation information. Accordingly, by reference to the ATT_SRP#1, the compatible player perceives the title as AVTT. In a subsequent process, as in the case with the video player reading the VTS number and the title number from the TT_SRP 254, the video player reads from the ATT_SRP 245 a VTS number including the title (VTS #1 even in this case) and a title number in the VTS [see a path designated by P1C(1) shown in FIG. 8]. Since a subsequent path is the same as that described with reference to the video player [see paths designated by P1C(2) and P1C(3)], repetition of its explanation is omitted here.

As has been described above, in addition to video navigation information and audio navigation information, a DVD stores information used for integrating together these information items as first reproduce control information or information used for linking these information items, thereby eliminating confusion, which could otherwise arise when a different type of player having different reproduce capability plays back a title whose reproduce pattern is different.

(5) Second Reproduce Control Information

Of the data recorded on the audio DVD, the second reproduce control information will now be described. The second reproduce control information designates SAPPT 204 recorded at the head of the audio zone. This SAPPT corresponds to a set of audio titles recorded on the disk and reproduce control information required for reproducing the audio data of the video-audio compatible title (AVTT/AOTT) in a limited pattern.

Of the reproduce patterns (or functions) which are prepared beforehand and can be fulfilled by use of the APGCI serving as the first reproduce control information, two-channel reproduce, changing of attributes on a per-track basis, an audio coding mode (compatible with only linear PCM), down-mix reproduce, scalable recording, float-recording of Channel_Group_#2, selection of a title group, track selection, and indication of a title group time and a track time can be fulfilled by use of SAPPT, which serves as the second reproduce control information.

As mentioned previously, in the audio DVD, substantial data, i.e., audio data, are recorded in the individual ATSs 203 or VTSs 4. Of the first reproduce control information, information about the addresses of cells and time information are written as APGCI in the ATSI 211 of each of the ATSs 3. Accessory information relating to the attribute of the audio data (AOB) is written in the ATSI 211 in each of the ATSs 3. Accordingly, reproduce of the audio data belonging to each of the title groups requires referring to the ATSI in each of the ATSs and acquisition of reproduce control information (APGCI) and attribute information.

The reproduce control information (APGCI) within the control data of the ATSI 211 comprises information for merely reproducing a track, as well as various information items for fulfilling various functions, e.g., information relating to individual cells and information for searching a track and for performing special reproduce operations. However, a majority of unsophisticated players such as portable players do not usually require many functions, and only a portion of the reproduce control information (APGCI) is used for such players. Every time a title is changed to another, new reproduce control information (AGPCI) must be read from the disk and recorded in memory. To ascertain the total number of tracks recorded over the disk, the attributes of tracks, and presence of overlapping tracks, all the reproduce control information items (APGCIs) must be read, retrieved, and computed, consuming much time and rendering reproduce inefficient.

In the present invention, reproduce control information for limitedly reproducing all the tracks (musical selections)—which are included in the audio title (AOTT) recorded on the DVD and can be reproduced over two channels or for reproducing data in a part of all the reproduce patterns prepared beforehand—is recorded as second reproduce control information (SAPPT) in the lead-in area LI or at the head of the audio zone. As a result, even in a case where any track belonging to a certain title group is reproduced, reproduce control information can be readily and quickly obtained without the player becoming aware of a title and ATS and VTS to which the title belongs, by reference to the SAPPT, thereby enabling smooth reproduce. More specifically, so long as reproduce control information is recorded in the lead-in area LI or at the head of the audio zone, reproduce control information required for reproducing a track immediately after loading of an audio DVD can be obtained.

As mentioned previously, the video-audio compatible DVD has a video zone pursuant to the DVD video format and an audio zone pursuant to the DVD audio format. The data that can be reproduced from the video-audio compatible DVD are AV data [movie data accompanied by audio data] such as movies and audio data. First reproduce control information items are recorded on the video-audio compatible DVD separately so as to correspond to individual players, in order to prevent confusion, which could otherwise arise when the information items are reproduced by means of any of various players. In contrast, second reproduce control information is relevant solely to the information relating to tracks which can be reproduced over two channels and is used for reproducing a title recorded in only a portion of the reproduce patterns. Although reproduce of the title by use of the first reproduce information has been described with reference to section (4), reproduce control making use of the second reproduce control information corresponds to the reproduce of both an audio title and a video-audio compatible title by use of an audio player, which has been described with reference to section (4.5.1).

In the case shown in FIG. 6, seven title groups are present on the video-audio DVD. Each of the title groups corresponds to a single title (for example, title group #1 corresponds to title #1, and title group #2 corresponds to title #2).

For the audio player that can reproduce only audio data, the title group may be perceived as corresponding to a single conventional CD album. In the case of the DVD shown in FIG. 6, the user may perceive that four different CD albums are recorded on a single audio DVD. The user selects a desired title group as if selecting a desired CD album from four different CD albums. However, the user having a compatible player may perceive seven title groups. In a case where there are video-only titles as shown in FIG. 6, the user must issue an instruction for "title group #5" in spite of the fact that when using the audio player the user actually selects the fourth title group. Accordingly, the user must issue an instruction for a desired title group through visual checking of the title on the jacket of the DVD.

Figure 10:
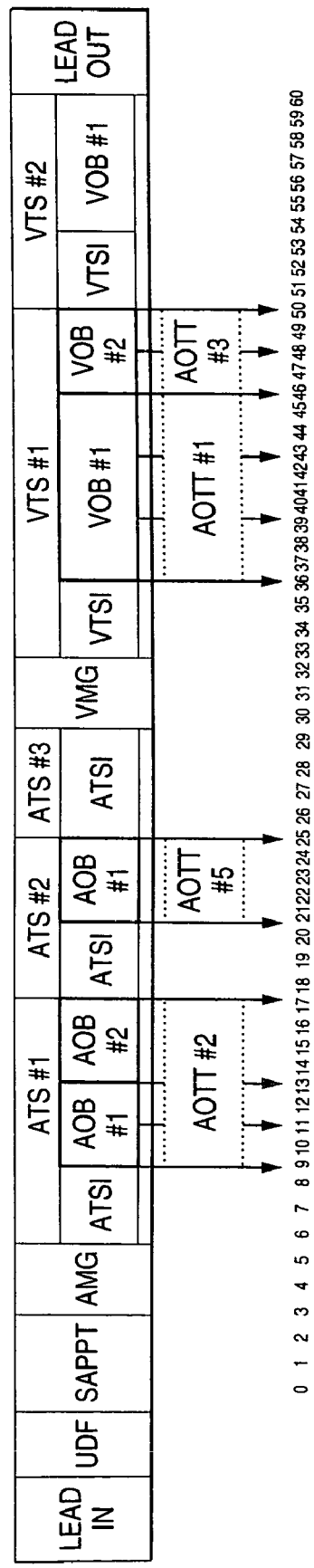
FIG. 10 is a diagrammatic representation showing the physical layout of data on the disk.

The information recorded on the SAPPT includes track (musical selection) numbers for each title group and start and end addresses of individual tracks. These addresses may be absolute addresses on the audio DVD or relative addresses on the audio DVD in relation to the location where the SAPPT is recorded. Further, a channel assignment which serves as information about the attributes of individual tracks, a sampling frequency fs, and the number of quantized bits Qb are also written in the SAPPT. Moreover, a start time and reproduce time of each of the tracks are also described in the SAPPT as time information relating to the tracks. FIG. 9 shows one example of information items written in the SAPPT having the logical structure shown in FIG. 6, and FIG. 10 shows the relationship between the logical structure shown in FIG. 6 and the physical layout of the disk.

When the user specifies a title group to be reproduced, an information reproducing apparatus can acquire information about all the tracks pertaining to a title group concerned, by reading only the SAPPT. The thus-obtained information corresponds to a portion of the APGCI serving as the previously-described first reproduce control information. By reference to the address information about individual tracks written in the SAPPT, audio data recorded in the ATSs or the audio data recorded in the VTSs ranging from the start address to the end address are reproduced. Reproduce of tracks by use of the SAPPT that serves as the second reproduce control information does not require the player to refer to the APGCI that serves as the first reproduce control information. However, reproduce of tracks by use of the SAPPT enables only a reproduce pattern in which, for example, linear PCM audio data are reproduced over two stereo channels. Thus, a variety of interactive reproduce patterns based on the APGCI cannot be carried out through reproduce based on the SAPPT.

Further, the SAPPT includes audio attribute information. This audio attribute information relates to the attributes of audio data of all the tracks which are recorded on the audio DVD and can be reproduced over two channels. The attribute information is formed from the information required for reproducing audio data over two tracks. More specifically, the audio attribute information comprises a method of encoding audio data, a sampling frequency, the number of quantized bits, the number of channels included as audio data, and channel assignment information representing the individual channels and the channel group. Reproduce by use of the SAPPT that serves as the second reproduce control information does not require the player to refer to the AMG and ATSI that serve as the first reproduce control information. The audio DVD player automatically adapts to these audio attribute information items and performs reproduce operations.

Reproduce by use of the SAPPT that serves as the second control information also yields the following advantages. The DVD audio format enables duplicated use of the same track (music selection) under another title. For example, the title group #3 may be configured so as to include the tracks that are originally included in the title groups #1 and #2. More specifically, the audio data that are identical to those of track #1 of the title group #1 may be included in the title group #3. The audio data corresponding to these overlapping tracks are identical and have the same address attribute information.

The player determines whether or not there is an overlap between tracks, by comparing the address information recorded in the SAPPT. The address information relating to any track that has been reproduced before now is stored in memory, and a determination is made as to whether or not address information identical with the address information relating to a track to be currently reproduced is already present in the memory. If the same address information is not resident in the memory, the current track is reproduced. In contrast, if the same address information is resident in the memory, the current track is determined to be an overlapping track, and the player stops reproducing the track.

As mentioned above, so long as a determination has been made as to the presence or absence of an overlap between tracks, the same track can be prevented from being reproduced in a overlapping manner or can be prevented from being dubbed onto a mini disk (MD) in a duplicated manner, when audio data recorded on the audio-only DVD are dubbed onto another information recording medium such as an MD.

As mentioned previously, the user perceives one title group as corresponding to a single conventional CD album. Therefore, in the previous example, provided that the user sends to the player an instruction for reproducing tracks from the title group #1 to the title group #3, repetitions of reproduce of the same track are carried out (such a reproduce mode will be hereinafter referred to as a "normal reproduce"). Some users may not prefer such repetitions of the same track. Further, in a case where tracks are dubbed from such an audio DVD onto an MD, repetitions of recording of the same track are carried out disadvantageously. In such a case, overlapping tracks can be readily detected by describing overlap flags in the SAPPT beforehand. A determination as to whether or not there are overlapping tracks is made by referring to the flags or comparison among address information items. If the overlapping tracks are not reproduced, repetitions of reproduce of the same track can be prevented. More specifically, all the substantial audio data (tracks) recorded on the disk can be reproduced once (such a reproduce mode will be hereinafter referred to as "non-overlapping reproduce").

Further, a reproduce time is recorded on the SAPPT. More specifically, a reproduce time of each track, a total length of reproduce time of each title group, a total length of reproduce time of the disk, and a total length of recording time of the disk are recorded in the SAPPT. The total length of reproduce time of the disk corresponds to a time required for reproducing the tracks of each group in sequence (i.e., for ordinary reproduce of tracks). In contrast, the total length of reproduce time of a disk corresponds to a total length of reproduce time in a non-overlapping reproduce mode in which the same track is not repeatedly reproduced. The total length of recording time is information useful for dubbing tracks from the audio DVD onto a tape. Alternatively, only a reproduce time of each track is stored in the SAPPT, and a total length of reproduce time for each of various combinations of tracks may be obtained by addition of the reproduce times of the individual tracks. For example, a total length of reproduce time of a disk may be obtained through summation of the reproduce times of the tracks included in all the title groups. The total length of recording time of the disk is obtained by making a determination as to the presence or absence of overlapping tracks, by referring to overlapping flags or comparison between the address information items, and by summation of the reproduce times of the tracks included in all the title groups exclusive of overlapping tracks.

(6) Player (6.1) Video DVD Player

Figure 11:
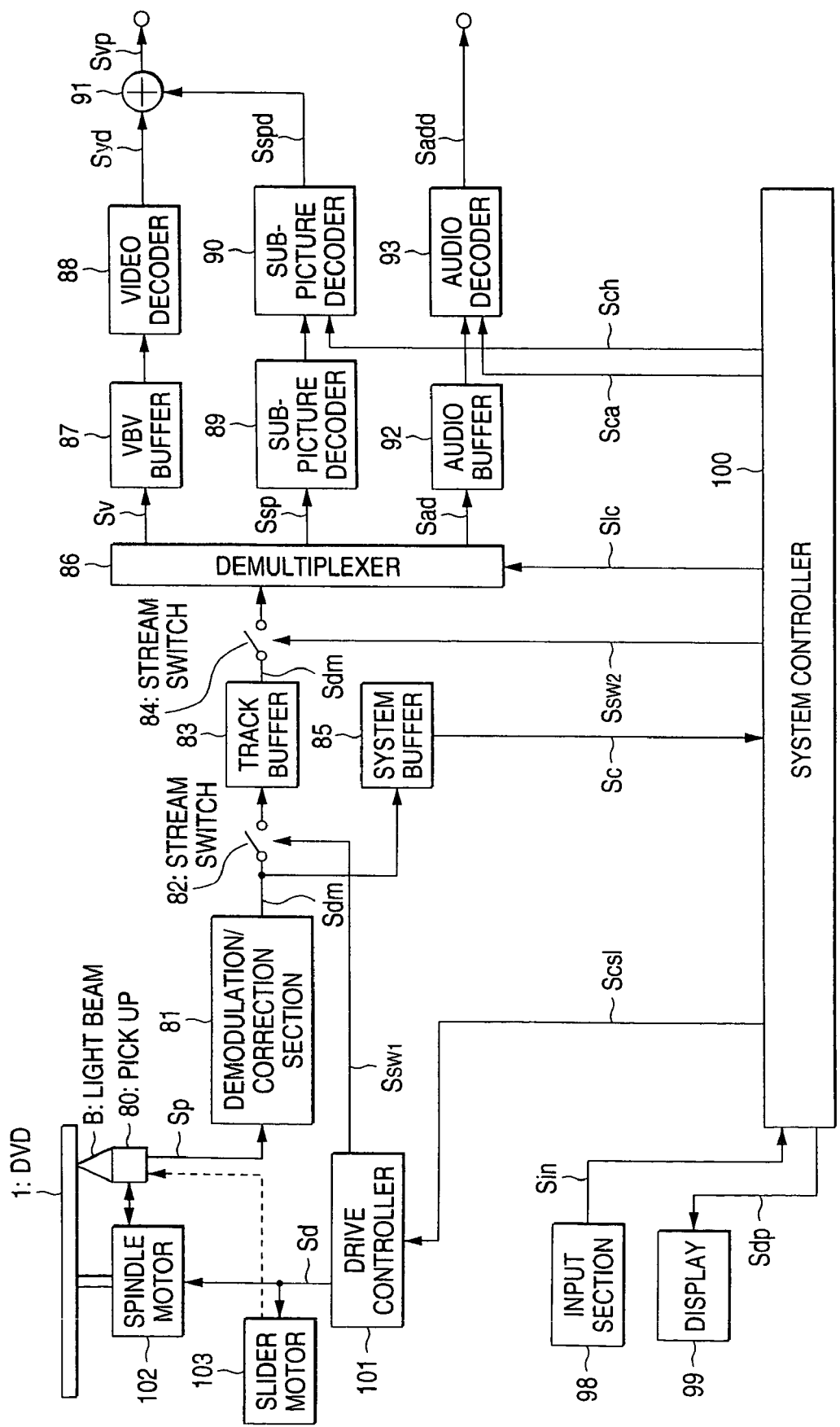
FIG. 11 is a schematic diagram showing the configuration of a video DVD player.

As shown in FIG. 11, the video DVD player according to the present embodiment comprises a pickup 80; a demodulation and correction section 81; stream switches 82 and 84; a track buffer 83; a system buffer 85; a multiplexer 86; a video buffer verifier (VBV) buffer 87; a video decoder 88; a sub-picture buffer 89; a sub-picture decoder 90; a mixer 91; an audio buffer 92; an audio decoder 93; an input section 98; a display 99; a system controller 100; a drive controller 101; a spindle motor 102; and a slider motor 103. Of the circuit configuration of the video DVD player, only blocks relating to reproduce of video and audio signals are shown in FIG. 11. The pickup 80, the spindle motor 102, and a servo circuit for servo-controlling the slider motor 103 are identical with those of conventional technique, and hence their descriptions and detailed explanations are omitted here.

The operation of the video DVD player will now be described.

The pick up 80 includes an unillustrated laser diode, a beam splitter, an objective lens, and a photo detector. The pick up 80 radiates a light beam B onto the DVD 1 as reproduce light and receives light resulting from the light beam B being reflected from the DVD 1, thereby outputting a detection signal Sp corresponding to data pits formed in the DVD 1. At this time, in order to correctly radiate the light beam B onto the data tracks on the DVD 1 as well as to correctly bring the light beam B into focus on the information recording surface of the DVD 1, the unillustrated objective lens is subjected to tracking servo control and focusing servo control by the same method as that conventionally used.

The detection signal Sp output from the pick up 80 is inputted to the demodulation correction section 81, where the signal is subjected to demodulation and error-correction processing to thereby produce a demodulation signal Sdm. The thus-produced demodulation signal Sdm is outputted to the stream switch 82 and the system buffer 85.

The stream switch 82 that receives the demodulation signal Sdm is opened or closed by means of a switch signal Ssw1 output from the drive controller 101. When in a closed state, the stream switch 82 permits passage of the thus-received demodulation signal Sdm, exactly as it is, and outputs to the track buffer 83. In contrast, when in an open state, the stream switch 82 does not output the demodulation signal Sdm, and hence unnecessary information (i.e., the demodulation signal) is not input to the track buffer 83. The track buffer 83 that receives the demodulation signal Sdm is formed from FIFO (First-in-first-out) memory or the like, temporarily stores the received demodulation signal Sdm, and continuously outputs the thus-stored demodulation signal Sdm when the stream switch 84 is in a closed state.

The stream switch 84 that continuously receives the demodulation signal Sdm is opened or closed by means of a switch signal Ssw2 output from the system controller 100 so as to prevent, during a demultiplexing operation by the demultiplexer 86, an overflow in various buffers on a subsequent stage or interruption of decoding operations, which would otherwise be caused when the stream switch 84 becomes depleted. The system buffer 85 that receives the demodulation signal Sdm, as the track buffer 83, stores management information (such as VMG 3)—which is first detected at the time of loading of the DVD 1 and relates to the overall information recorded on the DVD 1—or the VTS 11 provided for each VTS 4, outputs the management information or the VTS 11 to the system controller 100 as control information Sc, temporarily stores the DSI data 51 recorded in each navigation pack 41 during reproduce, and outputs the DSI data 51 to the system controller 100 as control information Sc.

The demultiplexer 86 that continuously receives the demodulation signal Sdm by way of the stream switch 84 extracts video data, audio data, and sub-picture data for each pack from the demodulation signal Sdm, extracts PCI data from the same for each navigation pack 41, and outputs the thus-extracted data to the VBV buffer 87, the sub-picture buffer 89, and the audio buffer 92 as a video signal Sv, a sub-picture signal Ssp, an audio signal Sad, and a PCI signal Spc. At this time, the demultiplexer 86 extracts a pack header from each pack (including the audio packs 43) and a packet header from each packet and outputs the information included in these headers to the system controller 100 as a header signal Shd.

The VBV buffer 87 that receives the video signal Sv is formed from FIFO memory or the like, temporarily stores the video signal Sv, and outputs the video signal Sv to the video decoder 88. The VBV buffer 87 compensates for variations in the quantity of data for each picture in the video signal Sv compressed according to the MPEG 2 scheme. The video signal Sv that have subjected to compensation for variations in the quantity of data is input to the video decoder 88, where the signal is demodulated into a demodulated video signal Svd according to the MPEG 2 scheme. This demodulated video signal Svd is output to the mixer 91. In contrast, the sub-picture buffer 89 that receives the sub-picture signal Ssp temporarily stores the thus-received sub-picture signal Ssp and outputs this sub-picture signal Ssp to the sub-picture decoder 90. The sub-picture buffer 89 outputs sub-picture data 44 included in the sub-picture video signal Ssp in synchronism with the video data 42 corresponding to the sub-picture data 44. The sub-picture signal Ssp in synchronism with the video data 42 is input to the sub-picture decoder 90, where the signal is demodulated into a demodulated sub-picture signal Sspd. This demodulated sub-picture signal Sspd is output to the mixer 91.

The demodulated video signal output from the video decoder 88 and the demodulated sub-picture signal Sspd output from the sub-picture decoder 90 (in synchronism with the corresponding demodulated video signal Svd) are mixed together by means of the mixer 91, thereby producing a final video signal Svp to be displayed. This video signal Svp is output to a display section such as an unillustrated CRT (cathode ray tube)

The audio buffer 92 that receives the audio signal Sad is formed from FIFO memory or the like. The audio buffer 92 temporarily stores the thus-received audio signal Sad and outputs the audio signal Sad to the audio decoder 93. On the basis of the header control signal Shc output from the system controller 100, the audio buffer 92 outputs the audio signal Sad in synchronism with the video signal Sv or sub-picture signal Ssp including corresponding video data. Depending on the output state of the corresponding video data, the audio buffer 92 delays the audio signal Sad. The audio signal Sad whose timing is controlled so as to become synchronized with corresponding video data is output to the audio decoder 93. On the basis of the header control signal Shc output from the system controller 100, the audio signal Sad is reproduced through linear PCM and is output to unillustrated speakers as a demodulated audio signal Sadd. In the audio DVD including solely audio data, there is no necessity for reproducing audio data in synchronism with video data.

(6.2) Audio DVD Player

Figure 12:
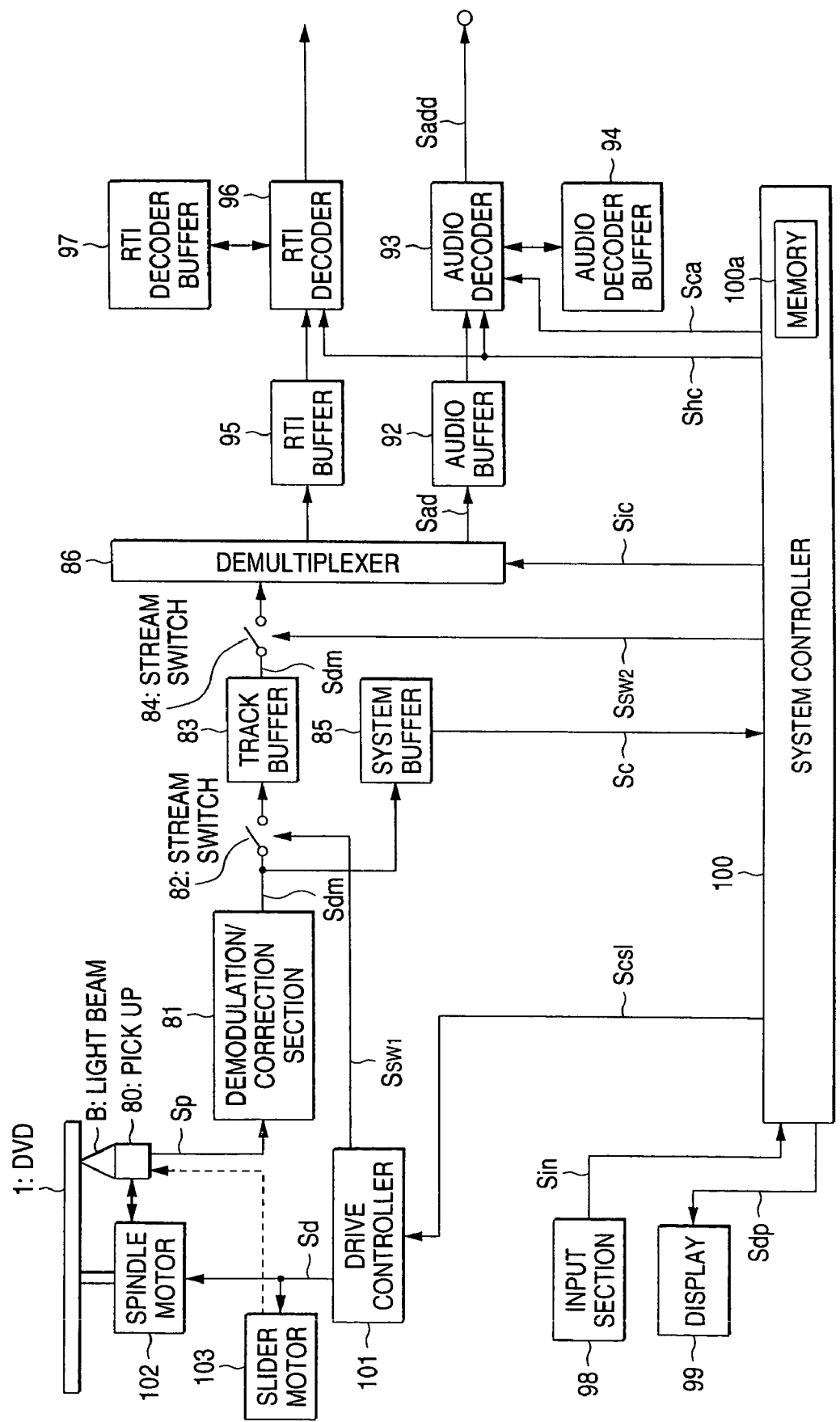
FIG. 12 is a schematic diagram showing the configuration of an audio DVD player.

The previously-described audio DVD player will now be described by reference to FIG. 12. As shown in FIG. 12, the audio DVD player differs from the video DVD player shown in FIG. 11 in terms of configuration of circuits provided on the stage subsequent to the demultiplexer 86. In other respects, both the audio DVD player and the video DVD player are identical in configuration with each other. For this reason, an explanation will be given of solely configuration of circuits provided on the stage subsequent to the demultiplexer 86.

The demultiplexer 86 that continuously receives the demodulated signal Sdm by way of the stream switch 84 extracts audio data from the demodulated signal Sdm for each pack and outputs this audio data to the audio buffer 92 as the audio signal Sad. The audio buffer 92 that receives the audio signal Sad is formed from FIFO memory or the like, temporarily stores the thus-received audio signal Sad, and outputs the audio signal Sad to the audio decoder 93. The audio signal Sad is input to the audio decoder 93 and is reproduced on the basis of the control signal Shc output from the system controller 100 to thereby produce the demodulated audio signal Sadd. This demodulated audio signal Sadd is output to unillustrated speakers.

Figure 13:
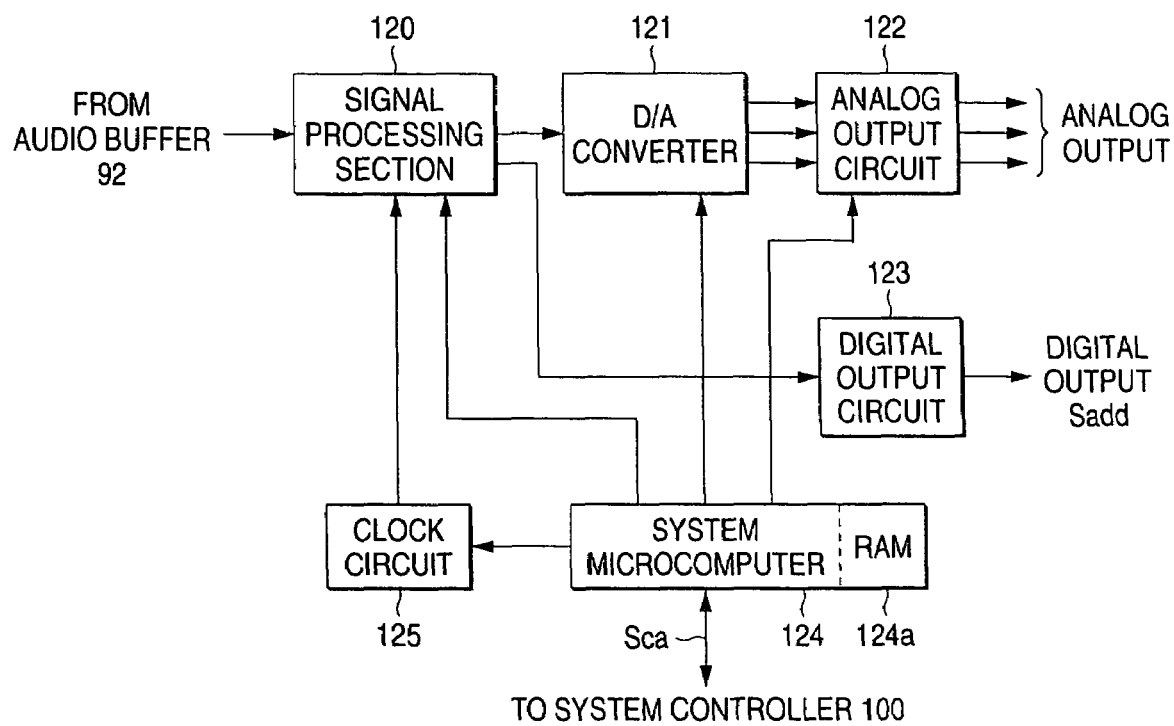
FIG. 13 shows a block diagram showing the configuration of an audio decoder.

FIG. 13 shows the configuration of the audio decoder 93. As shown in the drawing, the audio decoder 93 comprises a signal processing section 120 including a digital filter, etc., a digital-to-analog converter 121, an analog output circuit 122 including an amplifier, a digital output circuit 123, a system microcomputer 124 including RAM 124*a*, and a clock circuit 125.

The system microcomputer 124 exchanges a control signal Sca relative to the system controller 100 and controls operations of the clock circuit 125, the signal processing section 120, the digital-to-analog converter 121, and the analog output circuit 122. The system microcomputer 124 has built-in RAM 124*a*. The RAM 124*a* temporarily stores the audio attribute information supplied from the system controller 100 as the control signal Sca. The system microcomputer 124 refers to the audio attribute information stored in the RAM 124*a* and supplies the contents of the information to the clock circuit 125 and the signal processing section 120. More specifically, the system microcomputer 124 supplies sampling frequency information included in the audio attribute information to the clock circuit 125. The clock circuit 125 has an oscillator and supplies a clock signal fs corresponding to the received sampling frequency to the signal processing section 120. Further, the system microcomputer 124 supplies to the signal processing section 120 the sampling frequency, the number of quantized bits, the number of channels, and information as to whether or not the audio signal has been emphasized, all of which are included in the audio attribute information. The system microcomputer 124 further supplies information about the number of channels to the digital-to-analog converter 121. Further, the system microcomputer 124 supplies to the analog output circuit 122 information about the degree of amplification of a signal of each channel. The information about the degree of amplification of each channel is included in the audio attribute information and can be supplied from the system controller 100.

Through use of the clock signal fs received from the clock circuit 125, the signal processing section 120 demodulates the audio signal received from the audio buffer 92 or subjects the audio signal to bandwidth limitation, according to information relating to the encoding method (e.g., liner PCM or Dolby AC3) received from the system microcomputer 124, a sampling frequency, and the number of quantized bits. Further, the signal processing section 120 subjects the audio signal to de-emphasis processing according to the information as to whether or not the audio signal has been emphasized and outputs the thus-processed signal to the digital-to-analog converter 121. According to the channel information received from the system microcomputer 124, the digital-to-analog converter 121 splits an input signal on a per-channel basis and outputs the thus split signals to the analog output circuit 122 as analog signals on a per-channel basis. The signal processing section 120 outputs the digital audio signal Sadd to the outside by way of the digital output circuit 123.

Real-time data such as real-time text are output to an RTI buffer-from the demultiplexer and are temporarily stored therein. The data thus-stored in the demultiplexer are output to the RTI decoder on the basis of the control signal Shc output from the system controller 100. Wordings are displayed on an unillustrated display apparatus. If a necessity for temporarily interrupting an audio output (i.e., a pause) during reproduce immediately after an access to desired data is detected, the system controller 100 outputs a pause signal Sca to the audio decoder 93. The audio decoder 93 temporarily demodulates output of the demodulated audio signal Sadd.

Figure 19:
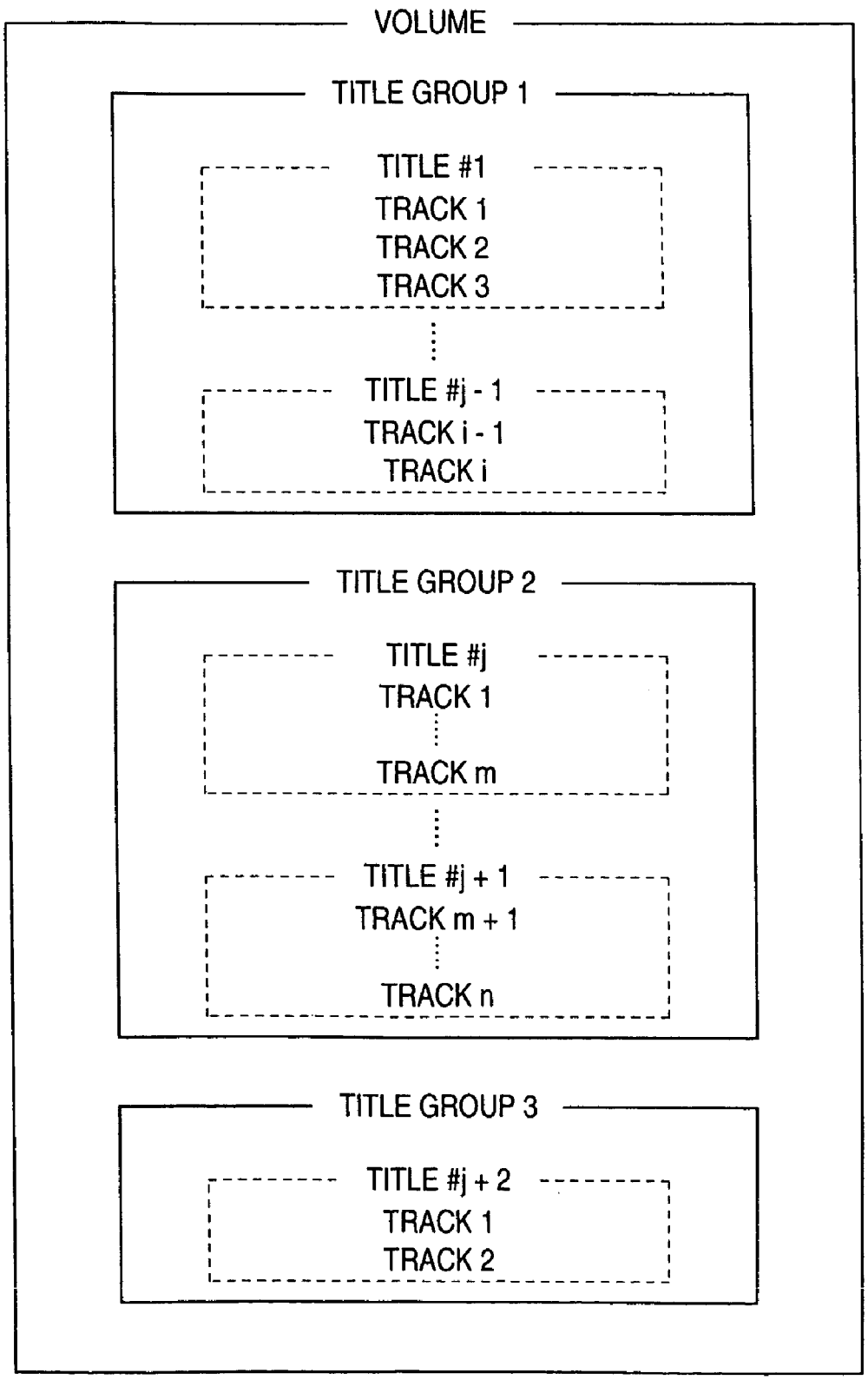
FIG. 19 is a schematic representation showing one example of a logical structure of an audio-only DVD.

(7) Reproduce Using First Reproduce Control Information, and Reproduce Method Using Second Reproduce Control Information (7.1) Reproduce Using First Reproduce Control Information Title reproduce is basic to reproduce using the first reproduce control information. Reproduce of an audio-only DVD having a logical structure as shown in FIG. 19 will now be described while primarily referring to title reproduce.

The audio only-DVD has a volume including title groups #1 to #3. The title group #1 comprises titles #1 to title #j−1, and the title #1 has three tracks. The title #j−1 has to tracks i−1, i. Each of the remaining tracks has one or a plurality of tracks. The title group #2 comprises titles #j, #j+1. The title #j has tracks ranging from 1 to "m," and the title #j+1 has tracks ranging from m+1 to "n." The title group #3 comprises a single title #j+2, and the title #j+2 has tracks 1 and 2. The relationship between the title group and the titles is written in the AOTT search pointer, as mentioned previously with reference to section (4). Accordingly, the AOTT search pointer must be read first.

Figure 14:
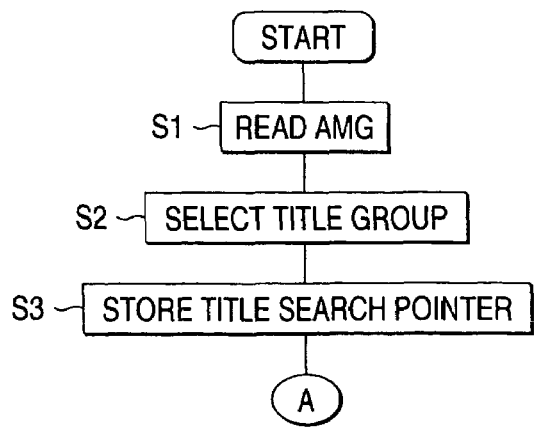
FIG. 14 is a flowchart showing reproduce operations when the player uses first reproduce control information.
Figure 15:
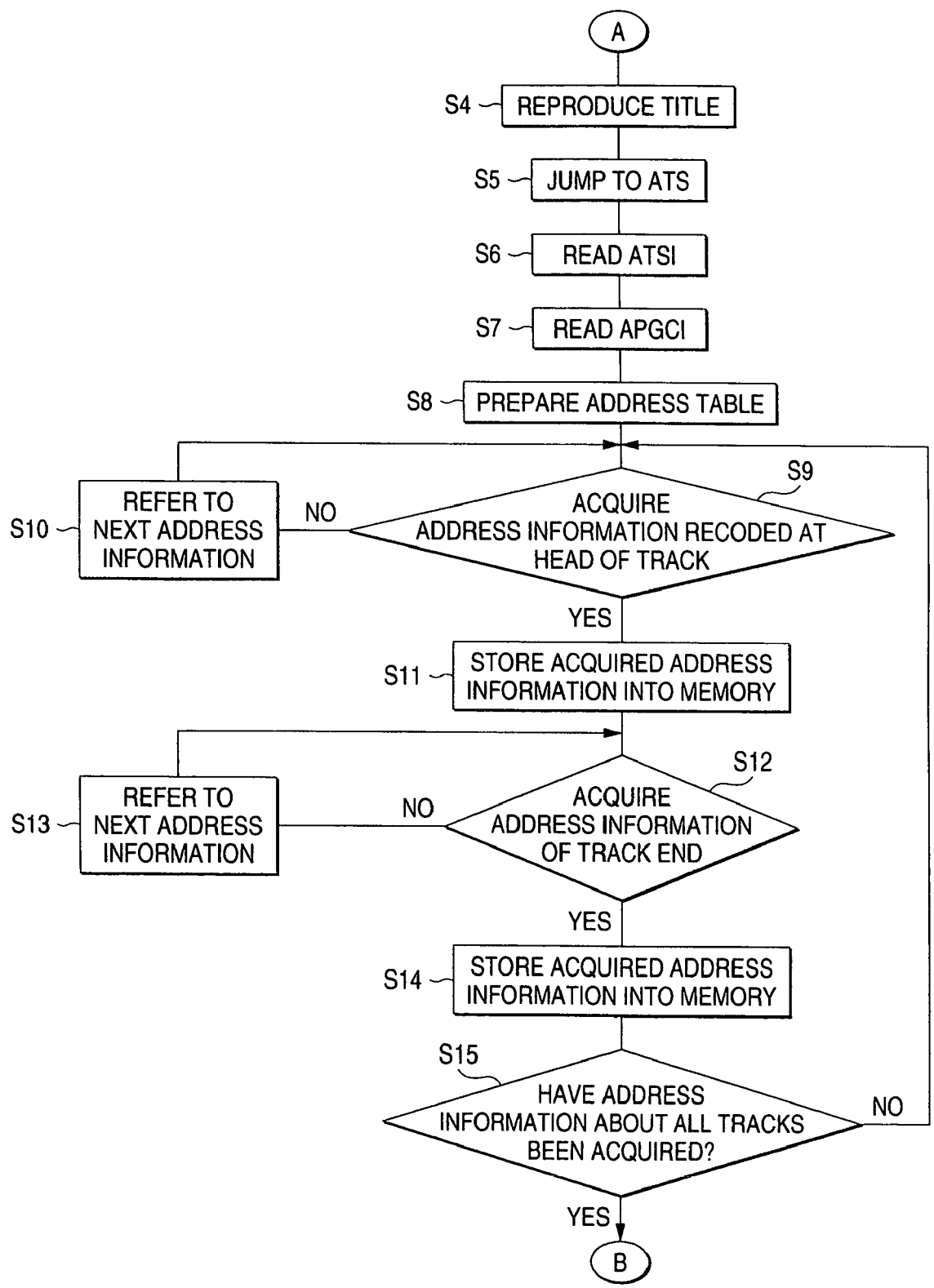
FIG. 15 is a flowchart showing reproduce operations when the player uses the first reproduce control information.
Figure 16:
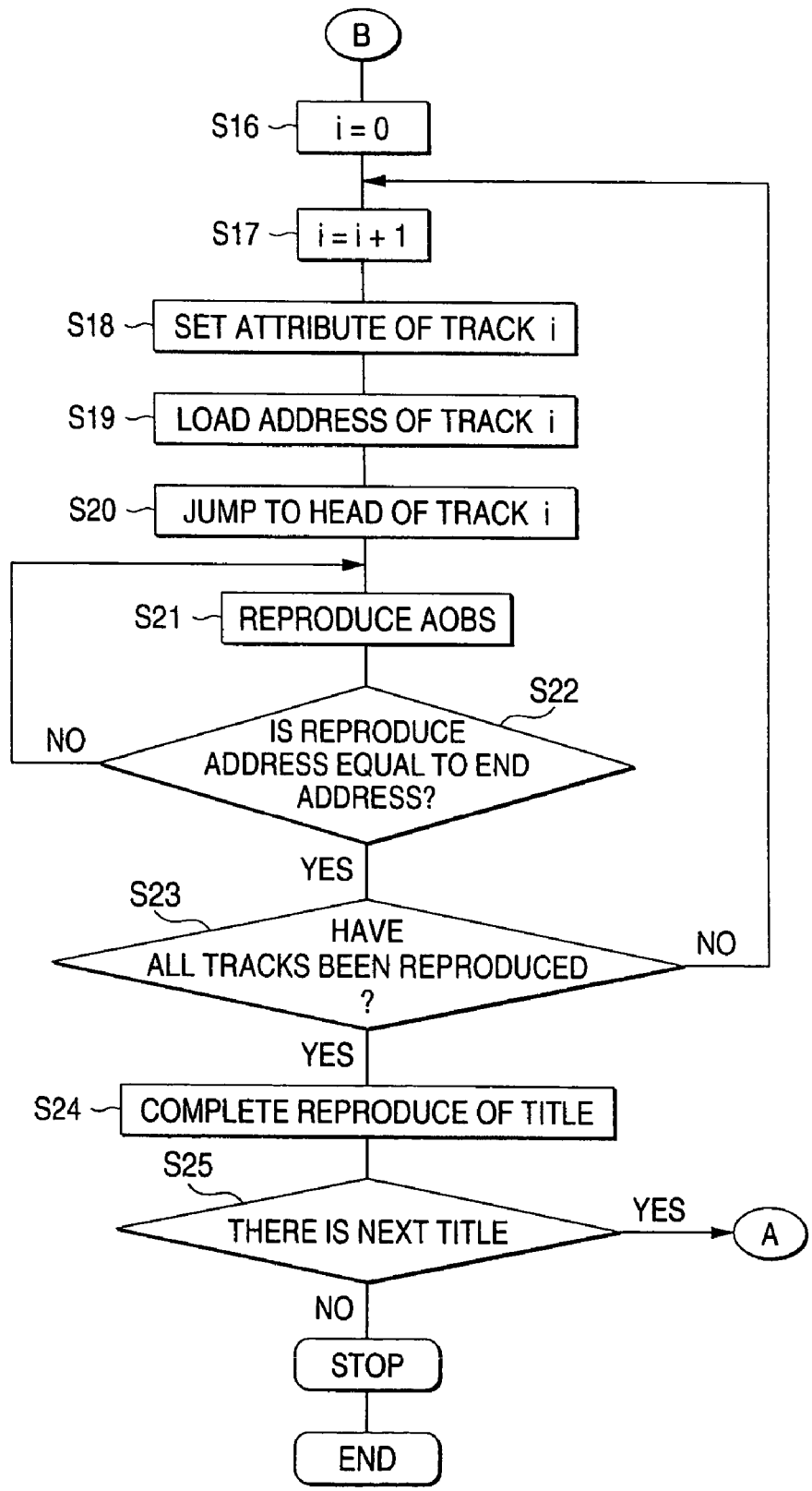
FIG. 16 is a flowchart showing reproduce operations when the player uses the first reproduce control information.

FIGS. 14 through 16 show operations of the player when the first reproduce control information is used. When the audio-only DVD is inserted into the player, the player reads the AMG after having checked the lead-in area LI and a read file structure of UDF (step S1). In response to an instruction from the user, the player acknowledges the title group to be reproduced (step S2). If no instruction is input by the user, the player acknowledges a predetermined title group, for example, the title group #1 or all the title groups, as a title group to be reproduced. The following description is based on the assumption that the user will select the title group #2.

The title search pointer that serves as navigation information about the titles included in the thus-selected title group is stored in memory (step S3). Since the title group #2 is selected, the title search pointer to be stored in memory corresponds to the title #j and the title #j+1. Since the DVD is an audio-only DVD, the search pointer which is actually stored in memory corresponds to AOTT_SRPT#j and AOTT_SRPT#j+1. After completion of storage of the search pointer, the player commences reproduce of titles (step S4). The pick up is jumped to the ATS#2 where the substantial data of the title #j and reproduce control information there about are recorded (step S5). The player reads the ATSI recorded in the ATS#2 (step S6) and reads the APGCI recorded in the ATSI that serves as the reproduce control information about the title #j (step S7).

By means of the thus-read information of the APGCI, the player can admit tracks included in the title #j as tracks 1 through "m" and prepares an address table for each of the tracks (step S8). Next, the player acquires the start and end addresses of each of the titles (steps S9 to S15). Under a more specific method of acquiring addresses, the player determines whether or not the address information acquired in step S9 corresponds to the start address of the head of the track. If the information corresponds to the start address (or if the result of step S9 is YES), processing proceeds to step S11, and the start address of the track is stored in memory. If this is not the case (or if the result of step S9 is NO), processing proceeds to step Sb0, where the player refers to the next address information. Then, processing returns to step S9.

After acquisition of the start address of the track, the player determines whether or not the next address information corresponds to the end address of the same track (step S12). If the information corresponds to the end address (or if the result of step S12 is YES), processing proceeds to step S14, where the end address of the track is stored-in memory. In contrast, if this is not the case (or if the result of step S12 is NO), processing proceeds to step S13, where the player refers to the next address information and returns to step S12. If the player has acquired both the start and end addresses of the track, processing proceeds to step S15, where the player determines whether or not the start and end addresses of all the tracks included in the title to be reproduced have been acquired. If there is a track whose addresses are not yet acquired (or if the result of step S15 is NO), processing returns to step S9, where a step of acquiring address information is repeated. If the start and end addresses of all the tracks included in the title to be reproduced have been acquired (or if the result of step S15 is YES), preparation of the address table is completed, and the track is reproduced.

To reproduce the track, "i" is first set to 0 in step S16. Next, processing proceeds to step S17, where a track number is incremented with i taken as i+1 (i=i+1). The player is set so as to match the attribute information of track number "i" (step S18). The start and end address of the track number "i" are loaded from the address table prepared previously (step S19). On the basis of the thus-loaded start address, the pick up is moved to the location on the disk where the substantial data of the track number "i" are recorded (step S20), and the AOBs are reproduced (step S21). When the address that is currently reproduced reaches the end address of the track number "i" (or if the result of step S22 is YES), processing proceeds to step S23. In contrast, if the address that is currently reproduced has not yet reached the end address of the track number "i" (or if the result of step S22 is NO), processing returns to step S21, where the AOBs are continuously reproduced.

In step S23, a determination is made as to whether or not the track number "i" has reached the number of tracks included in the title (if title number is #2, i=m). If the track number "i" has already reached the number of tracks included in the title (or if the result of step S23 is YES), it is determined that all the tracks included in the title #j have been reproduced, and processing proceeds to step S24, where reproduce of the title #j is finished. In contrast, if the track number "i" has not yet reached the number of tracks included in the title (or if the result of step S23 is NO), there still remain tracks which have not yet been reproduced. Hence, processing returns to step S17, and the next track will be reproduced. After completion of reproduce of the title #j, a determination is made in step S25 as to whether or not there still remains the next title to be reproduced. If there still remains titles to be reproduced (or if the result of step S25 is YES), the player refers to the title search pointer of the title #j+1 stored in step S3 and repeats the processing relating to the steps subsequent to step S4 in the same manner as that performed at the time of reproduce of the title #j. If no title to be reproduced remains (or if the result of step S25 is NO9, reproduce is completed.

(7.2) Reproduce Using the Second Reproduce Control Information

Figure 17:
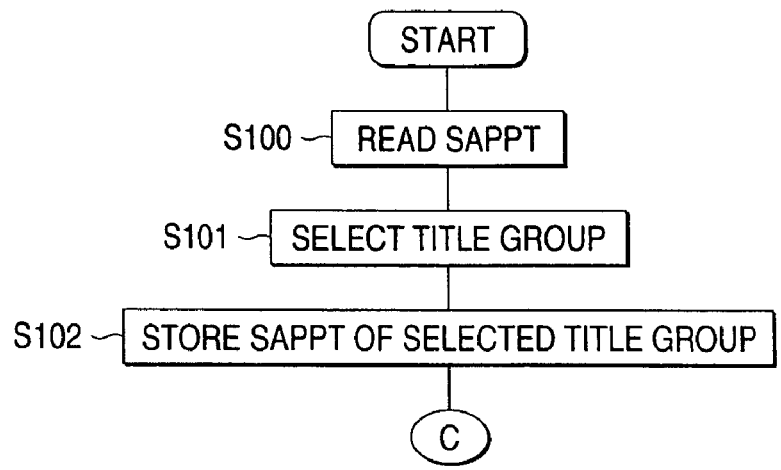
FIG. 17 is a flowchart showing reproduce operations when the player uses second reproduce control information.
Figure 18:
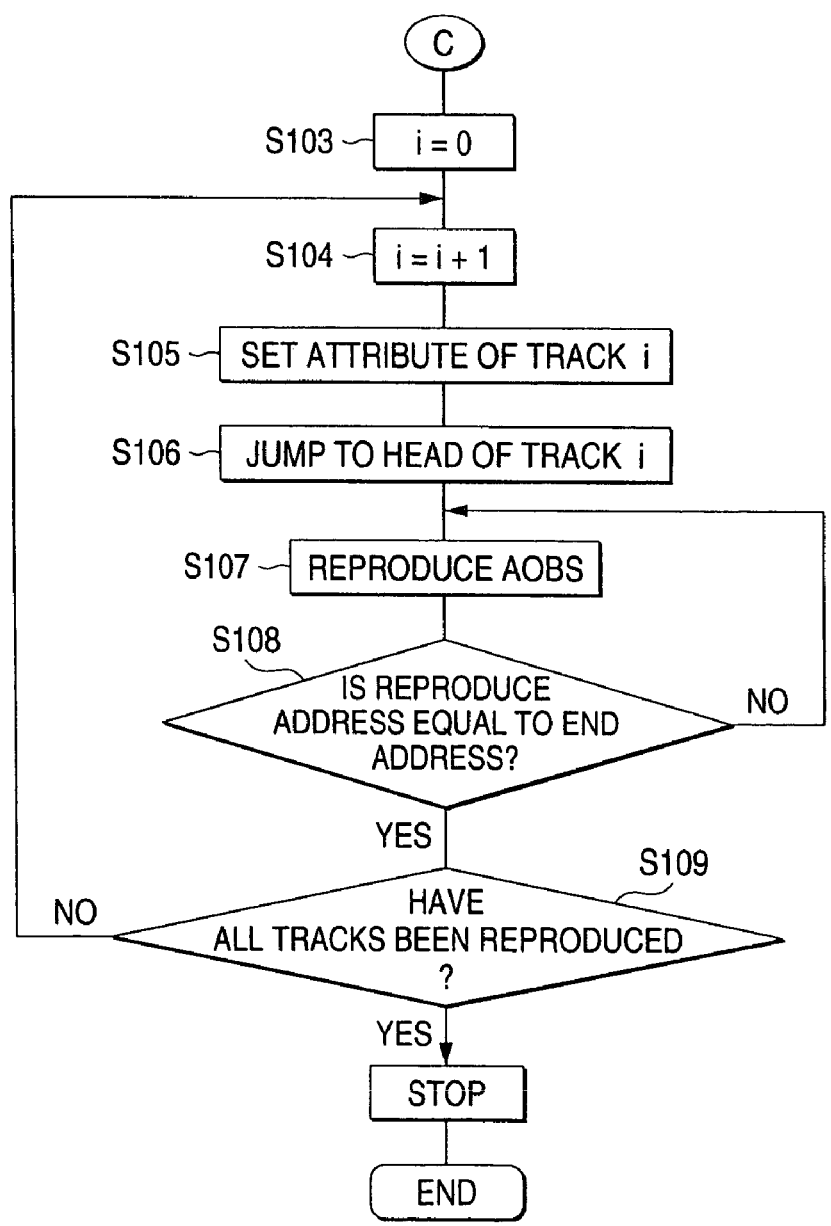
FIG. 18 is a flowchart showing reproduce operations when the player uses the second reproduce control information.

The operation of the player when the SAPPT serving as the second reproduce control information is used will now be described by reference to FIGS. 17 and 18. Here, the following description is also based on the assumption that an audio-only DVD having a logical structure as shown in FIG. 19 will be reproduced.

When the audio-only DVD is inserted into the player, the SAPPT recorded at the head of the audio zone is stored in memory (step S100). Next, in response to an instruction from the user, the player checks a title group to be reproduced (step S101). If no instruction is entered by the use, the player acknowledges a predetermined title group, for example, the title group #1 or all the title groups, as a title group to be reproduced. The following description is based on the assumption that the user selects the title group #2. Of the thus-stored SAPPT, the address and attribute information about all the tracks whose title group number is 2 are stored in memory (step S102). In contrast with reproduce using the first reproduce control information, reproduce using the second reproduce control information does not involve any necessity for the player to acknowledge the title and the ATSs including the title. If the title group to be reproduced is determined, the player can acquire all the information items required for reproducing the tracks included in the title group over two channels, by reference to the SAPPT. Since the title group #2 is selected, the information to be stored in memory relates to tracks from #1 to #n.

To reproduce the track, "i" is first set to 0 (i=0) in step S103. Next, processing proceeds to step S104, where a track number is incremented with i taken as i+1 (i=i+1). The player is set so as to match the attribute of sound data of track number "i" (step S105) On the basis of the start address of the track number "i," the pick up is moved to the location on the disk where the substantial data of the track number "i" are recorded (step S106), and the AOBs are reproduced (step S107). When the address that is currently reproduced reaches the end address of the track number "i" based on the SAPPT of the track number "i" (or if the result of step S108 is YES), processing proceeds to step S109. In contrast, if the address that is currently reproduced has not yet reached the end address of the track number "i" (or if the result of step S108 is NO), processing returns to step S107, where the AOBs are continuously reproduced.

In step S109, a determination is made as to whether or not the track number "i" has reached the number of tracks included in the title group (if title number is #2, i=n). If the track number "i" has already reached the number of tracks included in the title group (or if the result of step S190 is YES), it is determined that all the tracks included in the title group #2 have been reproduced, and reproduce of the title group #2 is completed. In contrast, if the track number "i" has not yet reached the number of tracks included in the title group #2 (or if the result of step S109 is NO), there still remain tracks which have not yet been reproduced. Hence, processing returns to step S104, and the next track will be reproduced. After completion of reproduce of all the tracks of the title group #2, reproduce is completed.

As mentioned above, even when the player plays back any track pertaining to any title group, the player can readily and quickly acquire reproduce control information by referent to the SAPPT, thus enabling smooth reproduce. More specifically, since the second reproduce control information is recorded in the lead-in area LI, in the AMG, or at the head of the audio zone, the player can immediately acquire reproduce control information required for reproduce after the audio DVD disk has been inserted into the player. Hence, the present invention enables fulfillment of a variety of complicated functions and interactive reproduce through use of first reproduce control information. In a case where a portion of limited functions is fulfilled, reproduce can be effected through simple processing by use of second reproduce control information.

According to a first aspect of the present invention, the second reproduce control information for reproducing the substantial data in a portion of reproduce patterns is recorded, thereby simplifying reproduce processing when substantial data are reproduced in a portion of reproduce patterns.

According to a second aspect of the present invention, the second reproduce control information is recorded in a predetermined location of a program area. Therefore, when reproducing the substantial data in a portion of the reproduce patterns, the player can make a direct access to the predetermined location.

According to a third aspect of the present invention, the reproduce patterns can be set for each track, thereby enabling reproduce of the substantial data in various reproduce patterns satisfying the user's demand.

According to a fourth aspect of the present invention, all the tracks can be reproduced by means of an information reproducing apparatus which can reproduce all the tracks, by use of the first reproduce control information. Further, for example, a portable player—whose functions are limited and which can reproduce only a portion of the tracks—can readily perform processing operations by use of the second reproduce control information.

According to a fifth aspect of the present invention, there are provided first reproduce control information for use with an information reproducing apparatus capable of reproducing substantial data into all the reproduce patterns, and second reproduce control information for use with an information reproducing apparatus capable of reproducing the substantial data into only a portion of the reproduce patterns. As a result, reproduce processing performed by the player capable of reproducing the substantial data into only a portion of the reproduce patterns can be simplified.

According to a sixth aspect of the present invention, since only the information required for reproducing the tracks in a portion of the reproduce patterns is recorded as the second reproduce control information, information relating to the tracks to be reproduced can be readily reproduced without involvement of complicated processing.

According to a seventh aspect of the present invention, the second reproduce control information can be obtained prior to reproduce of the substantial data.

According to an eighth aspect of the present invention, the second reproduce control information can be obtained prior to reproduce of the substantial data. Further, only audio data of the substantial data in the video zone can be reproduced by use of the second reproduce control information.

According to a ninth aspect of the present invention, the substantial data can be reproduced by reading the second reproduce control information, and a necessity for extracting required reproduce control information from the first reproduce control information may be eliminated, thus enabling simplification of reproduce processing.

According to a tenth aspect of the present invention, information relating to a track to be reproduced can be readily obtained without involvement of complicated processing.

What is claimed is:

1. An information recording medium comprising:
   a substantive data recorded on the information recording medium; and
   a control data recorded on the information recording medium, the control data being recorded for reproducing the substantive data,
   wherein the substantive data is recorded in a plurality of encoding methods, and
   wherein the control data includes a first control data for reproducing the substantive data corresponding to a plurality of coding modes at least including compression coding modes of AC3, MPEG-A, and DTS and non-compression coding modes of LPCM and a second control data for reproducing the substantive data corresponding to a plurality of coding modes that do not include the compression coding modes.

2. The information recording medium according to claim 1, wherein the substantive data includes audio information.

3. An information recording medium comprising:
   a substantive data recorded on the information recording medium; and
   a control data recorded on the information recording medium, the control data being recorded for reproducing the substantive data,
   wherein the substantive data is to be produced in a plurality of reproducing modes, and
   wherein the control data includes a first control data for reproducing the substantive data in the plurality of reproducing modes and a second control data for reproducing the substantive data in a subset of the plurality of reproducing modes.

4. The information recording medium according to claim 3, wherein the subset of the plurality of reproducing modes includes a stereo audio output.

5. The information recording medium according to claim 3, wherein the substantive data includes audio information.

6. A reproducing apparatus for reproducing information recorded on an information recording medium, the reproducing apparatus comprising:
   a reading section that reads data from the information recording medium;
   a reproducing section; and
   a controlling section that controls the reading section and the reproducing section,
   wherein the information reproducing medium includes:
      a substantive data recorded on the information recording medium; and
      a control data recorded on the information recording medium, the control data being recorded for reproducing the substantive data,
   wherein the substantive data is recorded in a plurality of encoding methods,
   wherein the control data includes a first control data for reproducing the substantive data corresponding to a plurality of coding modes at least including compression coding modes of AC3. MPEG-A, and DTS and non-compression coding modes of LPCM and a second control data for reproducing the substantive data corresponding to a plurality of coding modes that do not include the compression coding modes, and
   wherein the controlling section controls the reading section and the reproducing section to reproduce the substantive data in accordance with the first control data,
   the reproducing apparatus further comprising an extraction section that extracts the first control data from the control data,
   wherein the reproducing section reproduces the substantive data based on the extracted first control data.

7. A reproducing apparatus for reproducing information recorded on an information recording medium, the reproducing apparatus comprising:
   a reading section that reads data from the information recording medium;
   a reproducing section; and
   a controlling section that controls the reading section and the reproducing section,
   wherein the information reproducing medium includes:
      a substantive data recorded on the information recording medium; and
      a control data recorded on the information recording medium, the control data being recorded for reproducing the substantive data,
   wherein the substantive data is recorded in a plurality of encoding methods,
   wherein the control data includes a first control data for reproducing the substantive data corresponding to a plurality of coding modes at least including compression coding modes of AC3, MPEG-A, and DTS and non-compression coding modes of LPCM and a second control data for reproducing the substantive data corresponding to a plurality of coding modes that do not include the compression coding modes, and wherein the controlling section controls the reading section and the reproducing section to reproduce the substantive data in accordance with the second control data:

the reproducing apparatus further comprising an extraction section that extracts the second control data from the control data.

wherein the reproducing section reproduces the substantive data based on the extracted second control data.

8. A reproducing apparatus for reproducing information recorded on an information recording medium, the reproducing apparatus comprising:

a reading section that reads data from the information recording medium;

a reproducing section; and a controlling section that controls the reading section and the reproducing section, wherein the information reproducing medium includes:

a substantive data recorded on the information recording medium; and a control data recorded on the information recording medium, the control data being recorded for reproducing the substantive data, wherein the substantive data is to be produced in a plurality of reproducing modes, wherein the control data includes a first control data for reproducing the substantive data corresponding to a plurality of coding modes at least including compression coding modes of AC3, MPEG-A, and DTS and non-compression coding modes of LPCM and a second control data for reproducing the substantive data corresponding to a plurality of coding modes that do not include the compression coding modes, and wherein the controlling section controls the reading section and the reproducing section to reproduce the substantive data in accordance with the first control data, the reproducing apparatus further comprising an extraction section that extracts the first control data from the control data.

wherein the reproducing section reproduces the substantive data based on the extracted first control data.

9. A reproducing apparatus for reproducing information recorded on an information recording medium, the reproducing apparatus comprising:

a reading section that reads data from the information recording medium;

a reproducing section that reproduces the data read by the reading section; and a controlling section that controls the reading section and the reproducing section, wherein the information reproducing medium includes:

a substantive data recorded on the information recording medium; and a control data recorded on the information recording medium, the control data being recorded for reproducing the substantive data, wherein the substantive data is to be produced in a plurality of reproducing modes, wherein the control data includes a first control data for reproducing the substantive data corresponding to a plurality of coding modes at least including compression coding modes of AC3, MPEG-A, and DTS and non-compression coding modes of LPCM and a second control data for reproducing the substantive data corresponding to a plurality of coding modes that do not include the compression coding modes, and wherein the controlling section controls the reading section and the reproducing section to reproduce the substantive data in accordance with the second control data, the reproducing apparatus further comprising an extraction section that extracts the second control data from the control data.

wherein the reproducing section reproduces the substantive data based on the extracted second control data.

10. The information recording medium according to claim 1, wherein the substantive data corresponding to the plurality of coding modes that do not include the compression coding modes includes 2ch audio data.

* * * * *